US011939951B2

(12) United States Patent
Helmens

(10) Patent No.: US 11,939,951 B2
(45) Date of Patent: Mar. 26, 2024

(54) APPARATUS FOR ONSHORE OR OFFSHORE ERECTING AN UPSTANDING CONSTRUCTION

(71) Applicant: Mammoet Holding B.V., Utrecht (NL)

(72) Inventor: Wessel Helmens, Utrecht (NL)

(73) Assignee: MAMMOET HOLDING B.V., Utrecht (NL)

( * ) Notice: Subject to any disclaimer, the term of this patent is extended or adjusted under 35 U.S.C. 154(b) by 130 days.

(21) Appl. No.: 17/574,123

(22) Filed: Jan. 12, 2022

(65) Prior Publication Data

US 2022/0136486 A1    May 5, 2022

Related U.S. Application Data

(60) Division of application No. 16/511,974, filed on Jul. 15, 2019, now Pat. No. 11,231,015, which is a
(Continued)

(30) Foreign Application Priority Data

Jan. 16, 2017  (NL) ..................... 2018176
Jun. 15, 2017  (NL) ..................... 2019075
Aug. 29, 2017  (NL) ..................... 2019462

(51) Int. Cl.
*F03D 13/10* (2016.01)
*B66C 23/20* (2006.01)
(Continued)

(52) U.S. Cl.
CPC ............ *F03D 13/10* (2016.05); *B66C 23/207* (2013.01); *B66C 23/32* (2013.01); *E02B 17/00* (2013.01);
(Continued)

(58) Field of Classification Search
CPC ..... B66C 23/207; B66C 23/32; B66C 23/185; E02B 17/00; E02B 2017/0039;
(Continued)

(56) References Cited

U.S. PATENT DOCUMENTS 3,789,565 A    2/1974  Lindholm
6,868,646 B1   3/2005  Perina
(Continued)

FOREIGN PATENT DOCUMENTS

DE    19647515    5/1998
DE    19741988    4/1999
(Continued)

*Primary Examiner* — Jessie T Fonseca
(74) *Attorney, Agent, or Firm* — Peacock Law P.C.; Justin R. Muehlmeyer

(57) ABSTRACT

Methods and apparatuses for onshore or offshore erecting an upstanding construction comprising longitudinal construction parts, comprising the steps of providing the longitudinal construction parts, transporting the longitudinal construction parts on a vehicle to an erection site, providing a crane for hoisting the longitudinal construction parts, using the crane for placing the respective longitudinal construction parts on top of each other on a construction base at the erection site, providing the construction base and/or the longitudinal construction parts with a support and guide facility for the crane, arranging that the crane is mountable on the support and guide facility, and mounting the crane on the support and guide facility of at least one of the construction base and the longitudinal construction parts that is placed on the construction base, so as to arrange that the crane is movable up and down along the support and guide facility of the construction.

6 Claims, 47 Drawing Sheets

Related U.S. Application Data continuation of application No. PCT/NL2018/050026, filed on Jan. 15, 2018.

(51) Int. Cl.
    *B66C 23/32* (2006.01)
    *E02B 17/00* (2006.01)
    *E04H 12/34* (2006.01)
    *F03D 13/20* (2016.01)
    *F03D 13/25* (2016.01)

(52) U.S. Cl.
    CPC ............ *E04H 12/342* (2013.01); *F03D 13/20* (2016.05); *F03D 13/25* (2016.05); *E02B 2017/0039* (2013.01); *E02B 2017/0091* (2013.01); *F05B 2230/61* (2013.01); *F05B 2230/6102* (2013.01); *F05B 2240/916* (2013.01)

(58) Field of Classification Search
    CPC ........... E02B 2017/0091; E04H 12/342; F03D 13/10; F03D 13/20; F03D 13/25; F03D 13/40; F05B 2240/95; F05B 2230/61; F05B 2230/6102; F05B 2240/916; Y02E 10/72; Y02E 10/727; Y02P 70/50
    See application file for complete search history.

(56) References Cited

U.S. PATENT DOCUMENTS

| | | | |
|---|---|---|---|
| 9,238,923 | B2 | 1/2016 | Arlaban Gabeiras et al. |
| 9,657,495 | B2 | 5/2017 | Lockwood |
| 10,392,233 | B2 | 8/2019 | Mayer |
| 10,494,235 | B2 * | 12/2019 | Nelson .................. B66C 23/207 |
| 10,781,081 | B2 | 9/2020 | Kersten et al. |
| 10,865,077 | B2 | 12/2020 | Garitaonandia Aramberri et al. |
| 2002/0047277 | A1 | 4/2002 | Willis et al. |
| 2003/0183594 | A1 | 10/2003 | Torres |
| 2005/0163616 | A1 | 7/2005 | Mortensen |
| 2010/0067989 | A1 | 3/2010 | Brown et al. |
| 2010/0101086 | A1 | 4/2010 | Amram |
| 2014/0202971 | A1 | 7/2014 | Bosco et al. |
| 2016/0010621 | A1 * | 1/2016 | Zuteck .................... F03D 13/20 |
| | | | 212/199 |
| 2016/0010623 | A1 | 1/2016 | Zuteck |
| 2018/0282134 | A1 | 10/2018 | Lagerweij et al. |
| 2019/0338757 | A1 | 11/2019 | Helmens |
| 2020/0024110 | A1 | 1/2020 | Pubanz et al. |

FOREIGN PATENT DOCUMENTS

| | | |
|---|---|---|
| EP | 1350953 | 10/2003 |
| EP | 2908000 | 8/2015 |
| FR | 2903739 | 1/2008 |
| JP | S51-062222 | 5/1976 |
| JP | S59-158794 | 9/1984 |
| JP | H11-82285 | 3/1999 |
| JP | 2012092534 | 5/2012 |
| NL | 1032591 | 3/2008 |
| WO | 2011/134472 | 11/2011 |
| WO | 2013/012761 | 1/2013 |
| WO | 2014/082176 | 6/2014 |
| WO | 2014/163490 | 10/2014 |
| WO | 2018/132010 | 7/2018 |
| WO | 2019231329 A1 | 12/2019 |

\* cited by examiner

APPARATUS FOR ONSHORE OR OFFSHORE ERECTING AN UPSTANDING CONSTRUCTION

CROSS-REFERENCE TO RELATED APPLICATIONS

This application is a divisional of U.S. patent application Ser. No. 16/511,974, entitled "Method for Onshore or Offshore Erecting an Upstanding Construction", filed Jul. 15, 2019, which is a continuation of International Application No. PCT/NL2018/050026, entitled "Method for Onshore or Offshore Erecting an Upstanding Construction", filed Jan. 15, 2018, which claims priority to Netherlands Patent Application No. 2018176, entitled "Method for Onshore or Offshore Erecting an Upstanding Construction", filed Jan. 16, 2017, and Netherlands Patent Application No. 2019075, entitled "Method for Onshore or Offshore Erecting an Upstanding Construction", filed Jun. 15, 2017, and Netherlands Patent Application No. 2019462, entitled "Method for Onshore or Offshore Erecting an Upstanding Construction", filed Aug. 29, 2017, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Embodiments of the invention relate to a method for onshore or offshore erecting an upstanding construction comprising longitudinal construction parts, in particular parts of a windmill, comprising the steps of
  providing the longitudinal parts of the construction;
  transporting the longitudinal parts of the construction on a vehicle to an erection site;
  providing a crane for hoisting the longitudinal parts of the construction; and
  using the crane for placing the respective longitudinal parts of the construction on top of each other on a construction base at the erection site.
WO2014/082176 discloses a method in accordance with the preamble of claim 1 and a crane in accordance with the preamble of claim 9.

JP-S51-62222 discloses an erection device of a structure, wherein vertical guide frame members of a guide frame is composed with a mounting piece so as to disengage alternately via a pin.

DE 196 47 515 discloses a wind converter mounting device, wherein an at least two-armed crane scissors with a foot part and a head part pass, and which forms a temporarily unit with a converter tower, wherein each of the foot part and/or head part is detachably connected with the respective tower part, and the crane shears are provided with at least two hydraulic cylinders which realize a climbing rhythm. A boom of the crane scissors is equipped with a cable, with the help of which the tower parts of the tower are successively placed on each other.

EP-A-2 908 000 discloses a lifting device to assemble and disassemble turbine components in a wind turbine generator having a nacelle, wherein the lifting device comprises a fixed or revolver platform, that carries a tiltable and extendable set comprised by several telescopic modules, with stabilizing and guiding arms that dynamically adapt their position to the diminishing wind turbine tower diameter along the height of the tower by embracing pressure arms and sliding with wheels, while the telescopic modules extend or shrink to enable the access to the precise vertical position of the turbine component that needs to be changed or repaired; and wherein the last module is provided with supporting and fixing elements to hold the turbine component during the ascending or descending manoeuvre.

JP-S59-158794 discloses a crane for assembling a tower.

NL 1 032 591 discloses a crane for working with slander constructions, such as wind turbines or masts for broadcasting, comprising a basic unit with multiple telescoping sections which are extended in a working situation, wherein the sections are further oriented in a vertical direction and wherein the basic unit in its working position is anchored with a construction to the slander construction.

JP2012 092534 discloses a construction crane for lifting a support member mounted on a telescopic boom in order to construct a tower-like structure column extending up to a high position above the sky by stacking a plurality of strut members.

WO2013/012761 discloses an enhanced stability crane comprising a platform assembly; a telescoping main support mast coupled to the platform assembly; a crane base mounted on the main support mast; a power source residing within the crane base; a boom coupled to the crane base at a boom first end and projecting upwardly therefrom; a jib pivotably coupled to the boom proximate a boom second end and projecting upwardly therefrom; a maximum jib height of at least 262 feet; a crane load capacity of at least 160,000 pounds; and a clamping assembly coupled directly to the main support mast, the clamping assembly being configured to affix securely to a tower structure to stabilize the crane.

WO2014/163490 discloses a crane for erecting a structure, such as a wind turbine, comprising a base for support on the ground, a telescopic boom extendable to a predetermined height, and a top assembly comprising a guide for one or more hoist cables connectable to a load. The crane further has at least one connector connected to the telescopic boom, the at least one connector comprising a fixing assembly for rigidly connecting the crane to the structure in operation.

The reference method to erect an upstanding longitudinal construction, such as a windmill, is to lift and stack column segments to create a tower on which, in the case of a windmill, the wind turbine generator can be positioned at its design height. A crane is used to erect the column and place the wind turbine generator and rotor blades on top of the construction. Depending on the height of the windmill, the length of the crane boom needs to be adapted thereto in order to be able to reach the necessary elevation for the placement of the wind turbine generator and the rotor blades at the top of the upstanding construction. Disadvantageously however an increased length of the crane boom implies that the crane as a whole has to increase in size and weight in order to be able to provide the required capacity for erection of the upstanding construction.

BRIEF SUMMARY OF THE INVENTION

It is an objective of embodiments of the present invention to provide a method for onshore or offshore erecting of an upstanding construction comprising longitudinal construction parts, in particular parts of a windmill, wherein:
the eventual height of the upstanding construction is not determining the required length of the crane boom;
a more stable method of erecting an upstanding construction is provided that is less sensitive to weather conditions so that construction can continue also in weather conditions that would in the prior art prevent the continuation of erecting the upstanding construction;
the parameters of the crane in other respect is also independent of the height of the upstanding construction and of the mass of its components;
cost and effort to implement the method of erecting an upstanding construction remain relatively small and are basically independent from the height of the upstanding construction; and
the ground area or footprint required for the crane in proximity of the upstanding construction is relatively limited and smaller than with a crane of the prior art.

The inventors stress to note that particularly with the erection of a windmill the time gained or saved during the erection of the windmill is very valuable and can amount to millions of dollars, particularly when a series of windmills have to be erected. There is therefore an ongoing effort within the industry to come to smarter, quicker, and less costly solutions for the erection of windmills. The instant invention will hereinafter be basically elucidated with reference to the erection of a windmill, but it will be clear for the skilled person that the advantages that come within reach with the invention are equally available when the invention is used for the construction of other high upstanding constructions. The application of the invention to the erection of a windmill must therefore be seen as purely illustrative, without the invention being limited thereto.

The invention is embodied in the features of one or more of the appended claims.

Basically the method of one embodiment of the invention comprises the steps of:
providing the construction base and/or the longitudinal parts of the construction with a support and guide facility for the crane;
arranging that the crane is mountable on the support and guide facility; and
mounting the crane on the support and guide facility of at least one of the construction base and the longitudinal parts of the construction that is placed on the construction base, so as to arrange that the crane is then movable up and down along the support and guide facility of the construction, wherein completing the erection of the upstanding construction is done by removing the crane and removing the support and guide facility from the longitudinal parts of the construction.

Removal of the support and guide facility is particularly desirable with windmills to avoid inducements of turbulence when the wind is blowing past the upstanding construction. Such turbulence could adversely affect the rotor blades when in rotating operation.

The just-mentioned features of the invention provide the advantage that the footprint of the crane is independent from the size of the upstanding construction which is to be erected. Also the other dimensions and the weight of the crane are thus independent from the upstanding constructions size.

Another advantage is that the movements of the crane can remain limited which contributes to the stability of the entire construction process when the upstanding construction is build up from the ground. Severe weather conditions, particularly wind, only have a limited effect on the upstanding construction and on the crane mounted thereon during erection of the construction, particularly in comparison with the prior art solution.

Cost and effort to erect the upstanding construction can further remain limited since all preparatory work off-site can remain limited and be delayed until the construction will be done on-site. The prior art method is comparatively costly since most construction is then required to be done off-site, which necessitates also the use of costlier transportation and high-capacity cranes. The invention however provides the advantage that transporting the longitudinal parts of the construction and the crane to the erection site can be done on the same vehicle.

According to one embodiment of the invention it is preferred that:
transporting the longitudinal parts of the construction and the crane to the erection site is done with the construction parts and the crane resting in a horizontal position on the vehicle; and that
the crane is up-ended at the site into a vertical position so as to enable that the crane is mounted on the support and guide facility of at least one of the construction base and the longitudinal parts of the construction that is placed on the construction base. Thereafter the crane is immediately functional to be moved up and down the support and guide facility for moving loads up and down the gradually growing upstanding construction, as will be further explained hereinafter.

Up-ending of the crane into a vertical position can be done by different means; for instance using hydraulic cylinders or by using pull wires between the construction base and the crane. During up-ending a foot of the crane can be provided with a pivot point close to the support and guide facility provided on the construction base on which the crane will be mounted.

In connection with both onshore and offshore activities, the vehicle can be appropriately moved into the position which is best suited for mounting the crane on the supporting guide facility. If no appropriate position can be found, then the crane can first be mounted on an additional support that is provided on the construction base (or on a higher longitudinal construction part above the construction base), and then moved into its final position mounted on the support and guide facility on the construction base or the higher longitudinal construction part on top of the construction base.

For limiting the costs of transport and making handling of all parts of the upstanding construction and the crane easy, it is preferred that at least one of the longitudinal construction parts and the crane is/are provided with dimensions equal or less than the dimensions of a standard sea freight container.

The actual erection of the upstanding construction is preferably initiated by moving the crane from the vehicle into an initial position on the support and guide facility that is provided on one of the construction base and the longitudinal part of the construction that is first placed on the construction base.

The erection of the upstanding construction can then take place by repeatedly positioning the crane at a top level of the support and guide facility of the highest longitudinal part of the construction, and picking up with the crane a next longitudinal part of the construction that still rests on the vehicle or at base level, and subsequently placing said next longitudinal part on top of the longitudinal part that supports the crane, while arranging that the support and guide facility of the respective longitudinal parts of the construction that are placed on top of each other are kept in line. Accordingly the crane can reach ever increasing heights corresponding each time with the up till then latest placed and highest longitudinal construction part of the tower of construction parts.

In the example wherein the upstanding construction is a windmill, it is preferred to use the crane for picking up and placing the windmill generator and hub on top of the upstanding construction, followed by using the crane for picking up and placing the rotor blades on the hub.

As mentioned the method of erecting the upstanding construction can be used onshore and offshore. It is preferred that with onshore erection the vehicle is a trailer, and that with offshore erection the vehicle is a floating vessel or a jack-up vessel. In case of a floating vessel it is preferred that the vessel deck is stabilized.

Embodiments of the invention are also well equipped to execute maintenance on or to execute dismantling of the upstanding construction. Both activities involve replacing the support and guide facility along the longitudinal parts of the construction and mounting a crane on the support and guide facility. The crane can then be applied for providing maintenance to the upstanding construction or for part by part top-down removal of the respective longitudinal parts of the construction.

Embodiments of the present invention also include a crane which is arranged for moving up and down a vertical support and guide facility, wherein the crane comprises a mast which is movable up and down the support and guide facility, and wherein the remainder of the crane which comprises the crane's hoisting means is rotatably mounted on the mast.

In a preferred embodiment of the crane the mast is provided with upper and lower mounting slides for cooperation with the vertical support and guide facility, and that the mast is telescopically extendable between the upper and lower mounting slides. This makes it possible to selectively guide the hoisting forces at its strong points into the construction being erected, and also results in a simpler design of the crane which is easier to use.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The invention will hereinafter be further elucidated with reference to the drawing primarily illustrating methods according to the invention that is not limiting as to the appended claims. The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

DETAILED DESCRIPTION OF THE INVENTION

Figure 1:
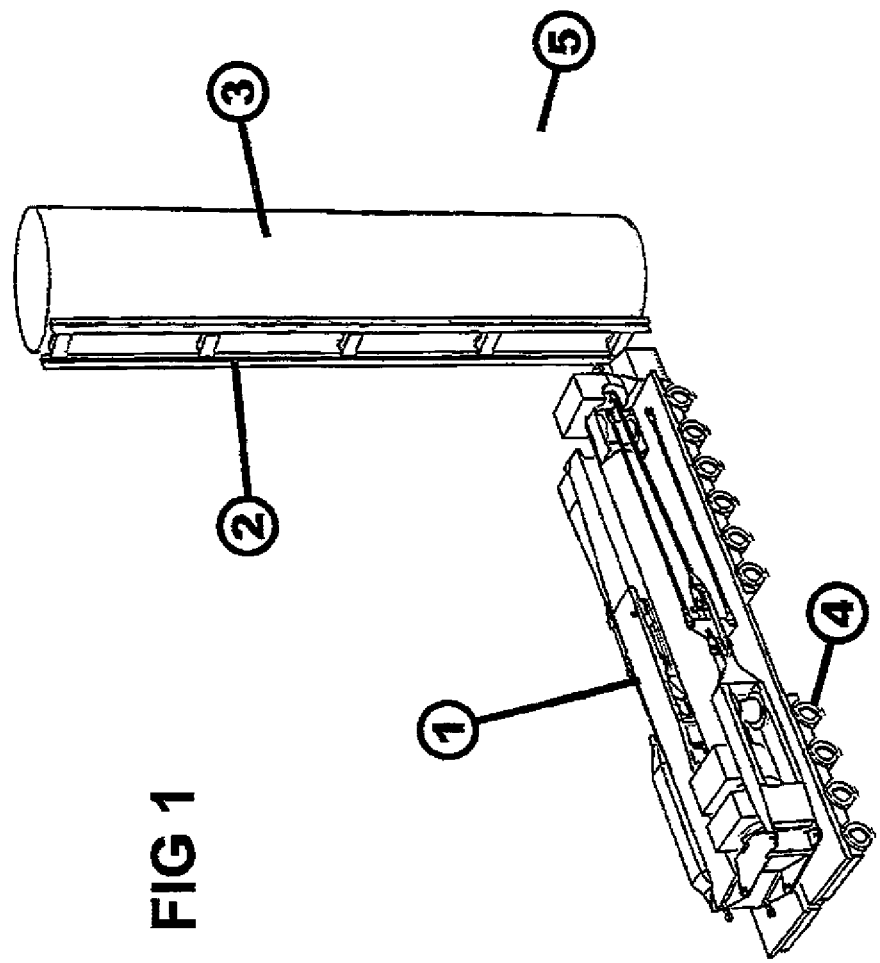
FIGS. 1-7 illustrate a method of mounting a crane on a construction base for an upstanding construction which is to be erected according to an embodiment of the present invention.

Whenever in the Figures the same reference numerals are applied, these numerals refer to the same parts.

First an explanation will be provided with reference to FIGS. 1-7 of mounting a crane 1 according to an embodiment of the present invention on a support and guide facility 2 on a construction base 3 onshore. The way of mounting the crane 1 when the construction base is onshore is preferably the same as when the construction base would be offshore, so a detailed explanation and showing of mounting the crane on a support and guide facility on a construction base which is located offshore can be dispensed with.

In FIG. 1 the longitudinal parts of the construction are for clarity not shown. FIG. 1 shows however that the crane 1 is placed in a horizontal position on a vehicle 4, for example, a trailer, and moved to an erection site 5 where for instance a windmill construction base 3 is located.

Figure 2:
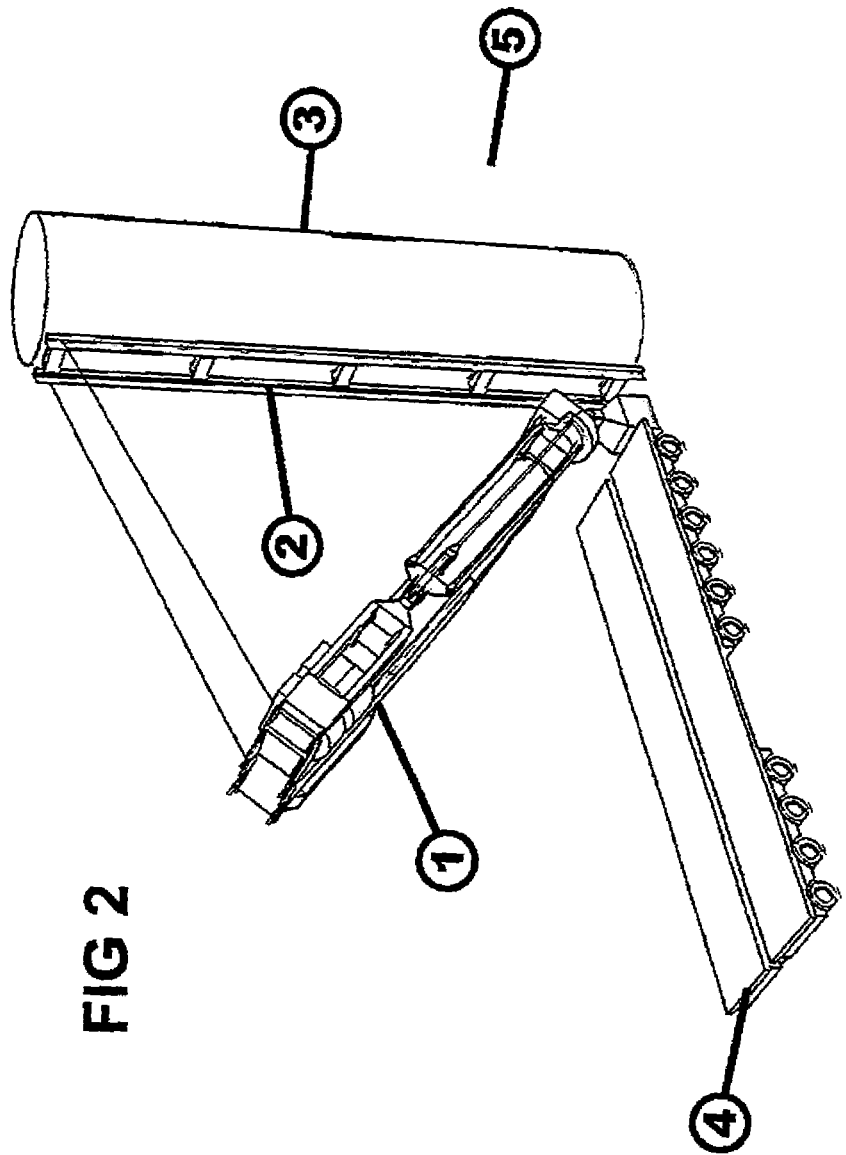
Figure 3:
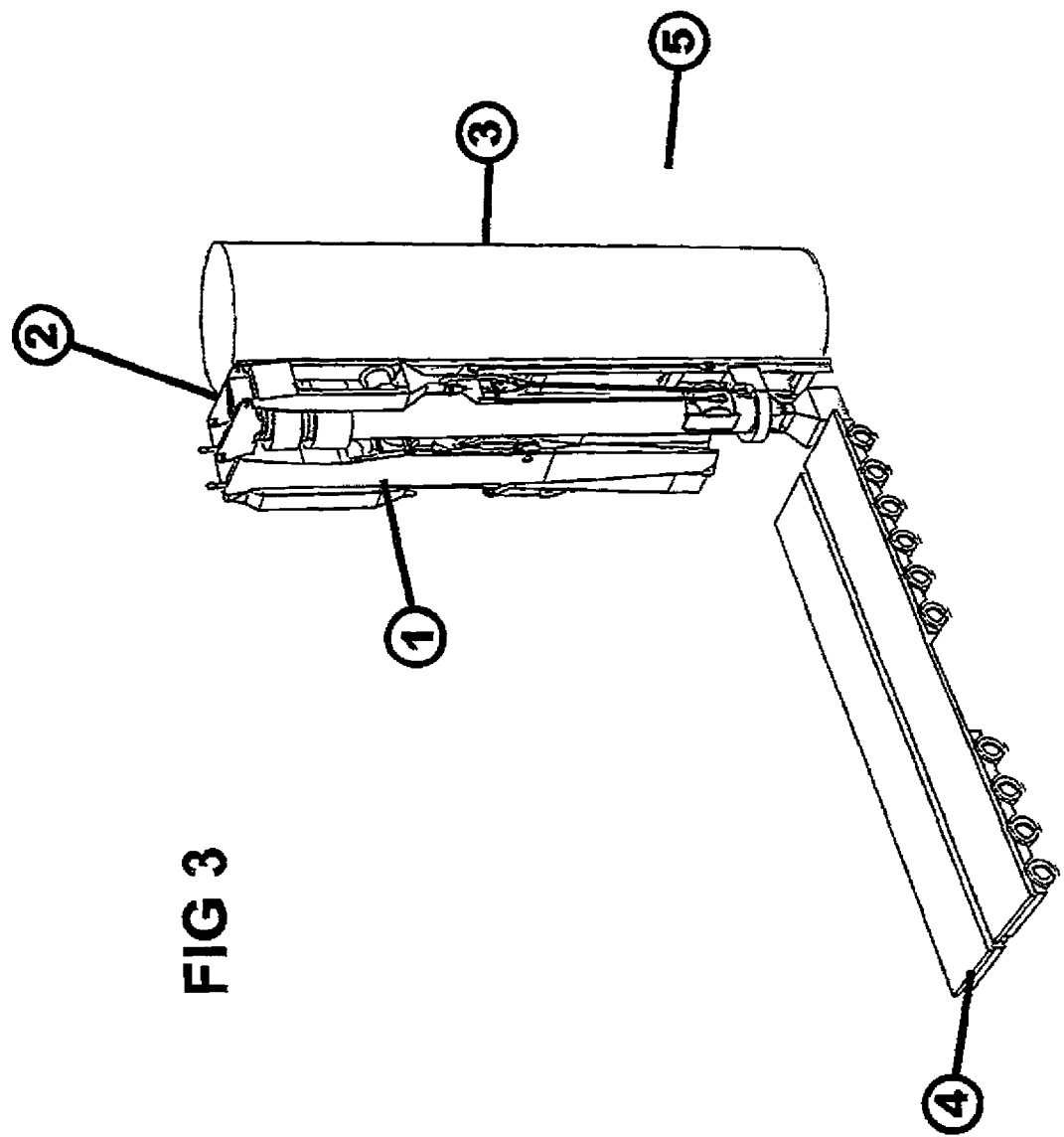
Figure 4:
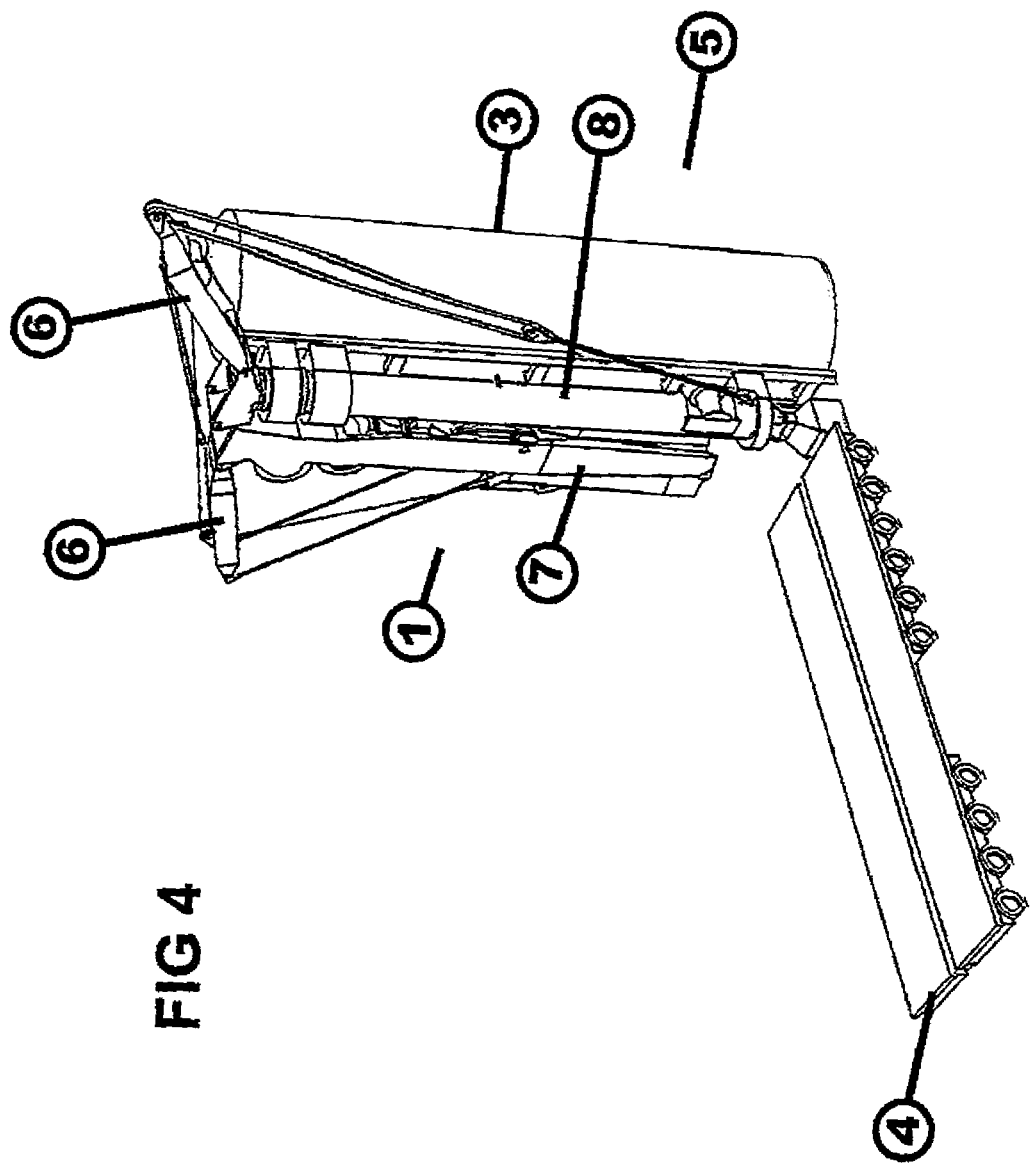
Figure 5:
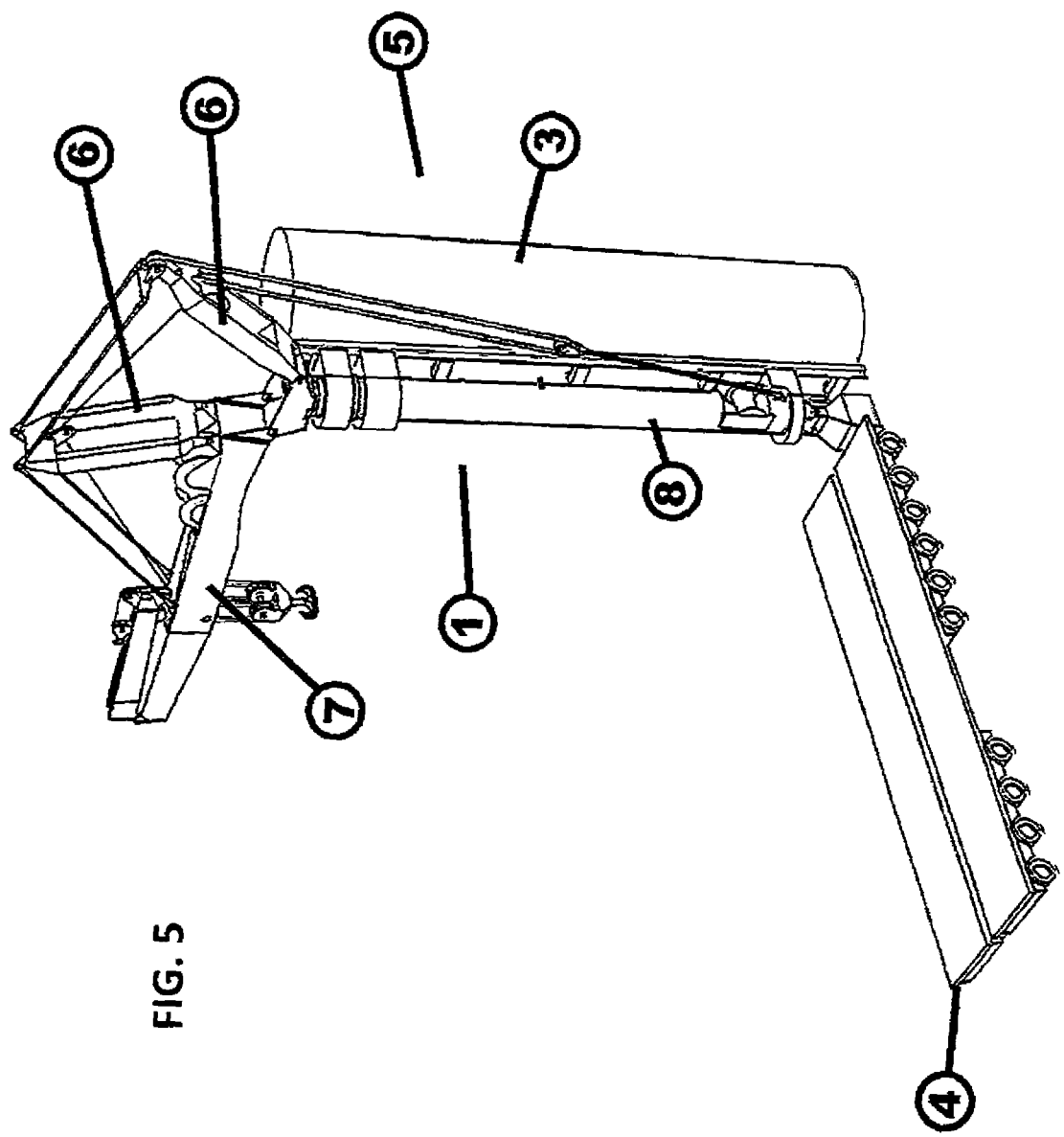
Figure 6:
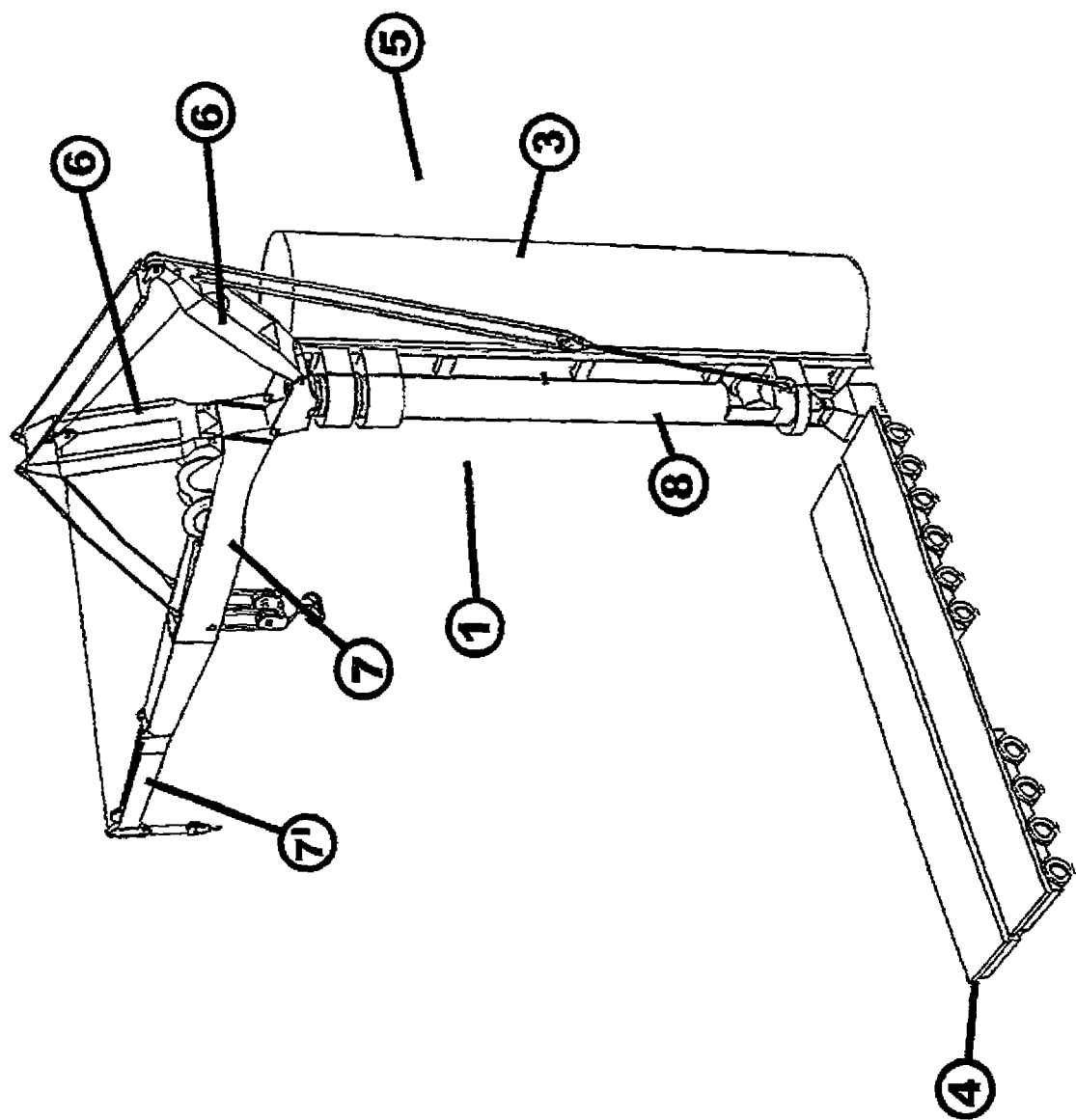

FIG. 2 shows the subsequent up-ending of the crane 1 into a vertical position which is reached in FIG. 3, and which enables that the crane 1 is mounted on the support and guide facility 2 of the construction base 3. Needless to say that if there would already be a first or higher longitudinal part positioned on the construction base 3, the crane 1 could also be mounted on this first or higher longitudinal part of the construction that would be on top of the construction base 3.

Figure 7:
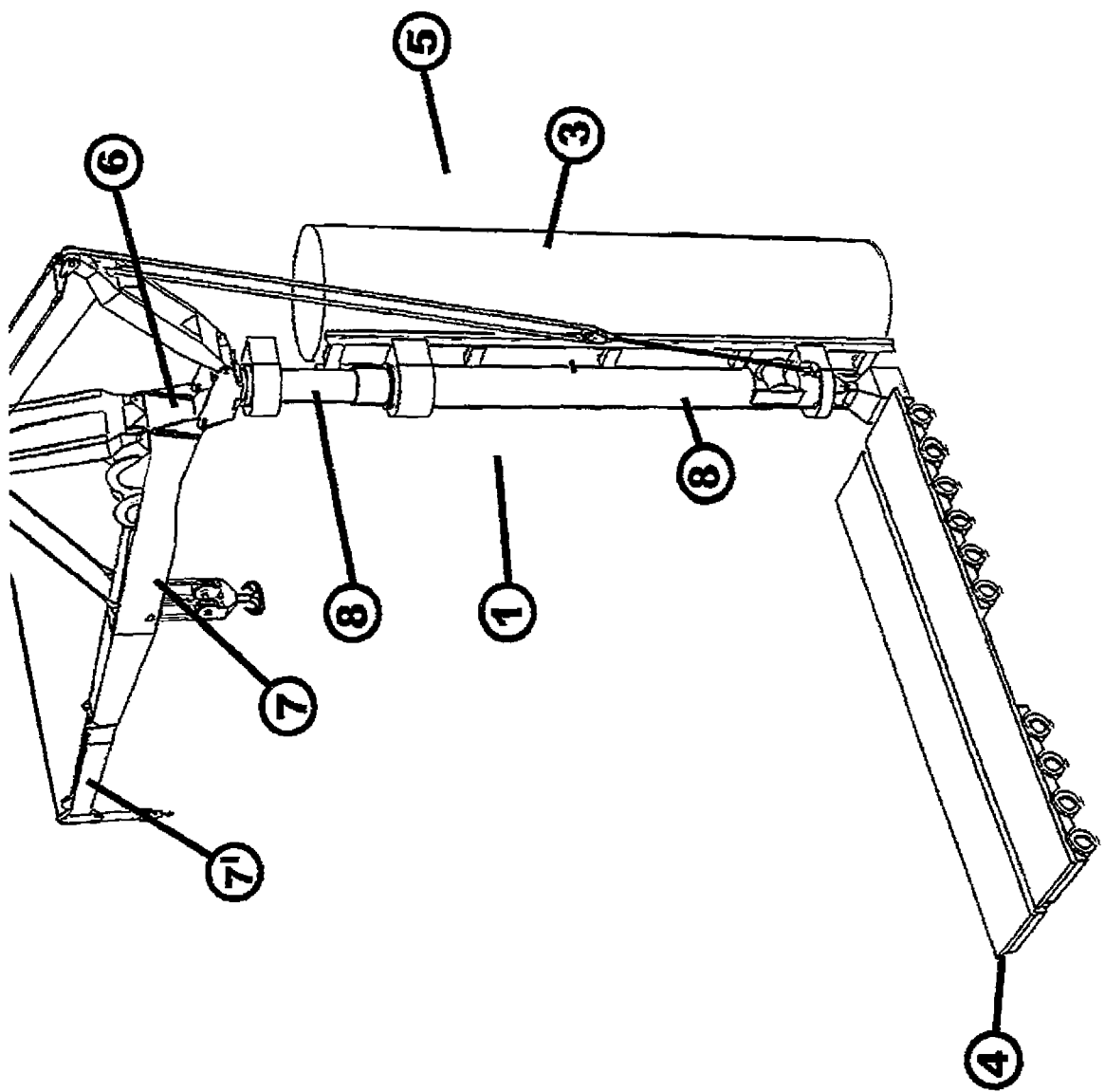

FIG. 3 shows that the crane 1 is still in a folded condition. In FIGS. 4-7 the crane is unfolded by extending first the struts 6 of the crane (FIG. 4); and subsequently extending the jib 7 of the crane 1 (FIG. 5); extending the jib extension 7' (FIG. 6); and extending a telescopic piece 8' from the mast 8 that is mounted on the support and guide facility on the construction base 3 (FIG. 7). The crane 1 is then ready for use. It is to be noted that the crane 1 as depicted in FIGS. 1-7 is a crane according to a first embodiment of the invention. The invention however also embraces a crane 1 according to a second embodiment of the invention as will be explained hereinafter with reference to FIGS. 19-25. In the crane 1 according to this second embodiment of the invention the mast 8 is provided with upper and lower mounting slides 14, 15 (as is shown in FIGS. 19-25) for cooperation with the vertical support and guide facility 2 mounted on the construction to be erected, wherein the mast 8 is telescopically extendable between the upper and lower mounting slides 14, 15. Mounting this crane 1 according to the second embodiment on the vertical support and guide facility 2 is executed similarly as explained with reference to FIGS. 1-7 relating to the crane 1 according to the first embodiment of the invention. Use of the crane 1 according to the second embodiment differs however slightly from the use of the crane 1 according to the first embodiment, which will now first be discussed.

Using the crane 1 according to the first embodiment of the invention can be elucidated with reference to FIGS. 8-18 illustrating the case that the erection of the upstanding construction is done offshore. It is remarked that the following elucidation of erecting the construction offshore will likewise be applicable to erecting the upstanding construction onshore. The details of the method of the invention are the same in both situations. A specific elucidation with reference to an erection onshore can therefore be dispensed with.

Figure 8:
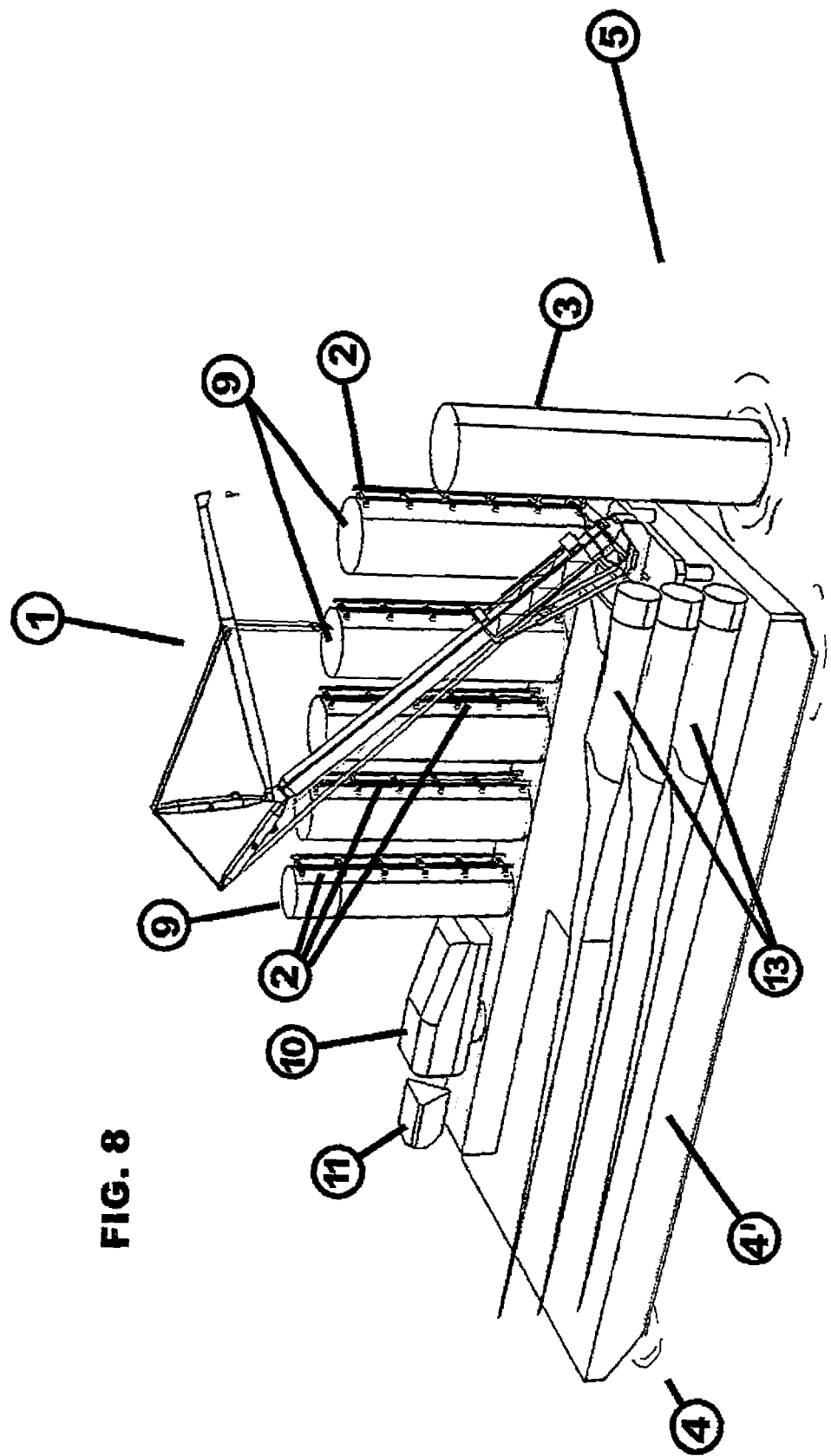
FIGS. 8-18 illustrate a method of erecting an upstanding construction comprising longitudinal construction parts using a crane according to an embodiment of the present invention.
Figure 9:
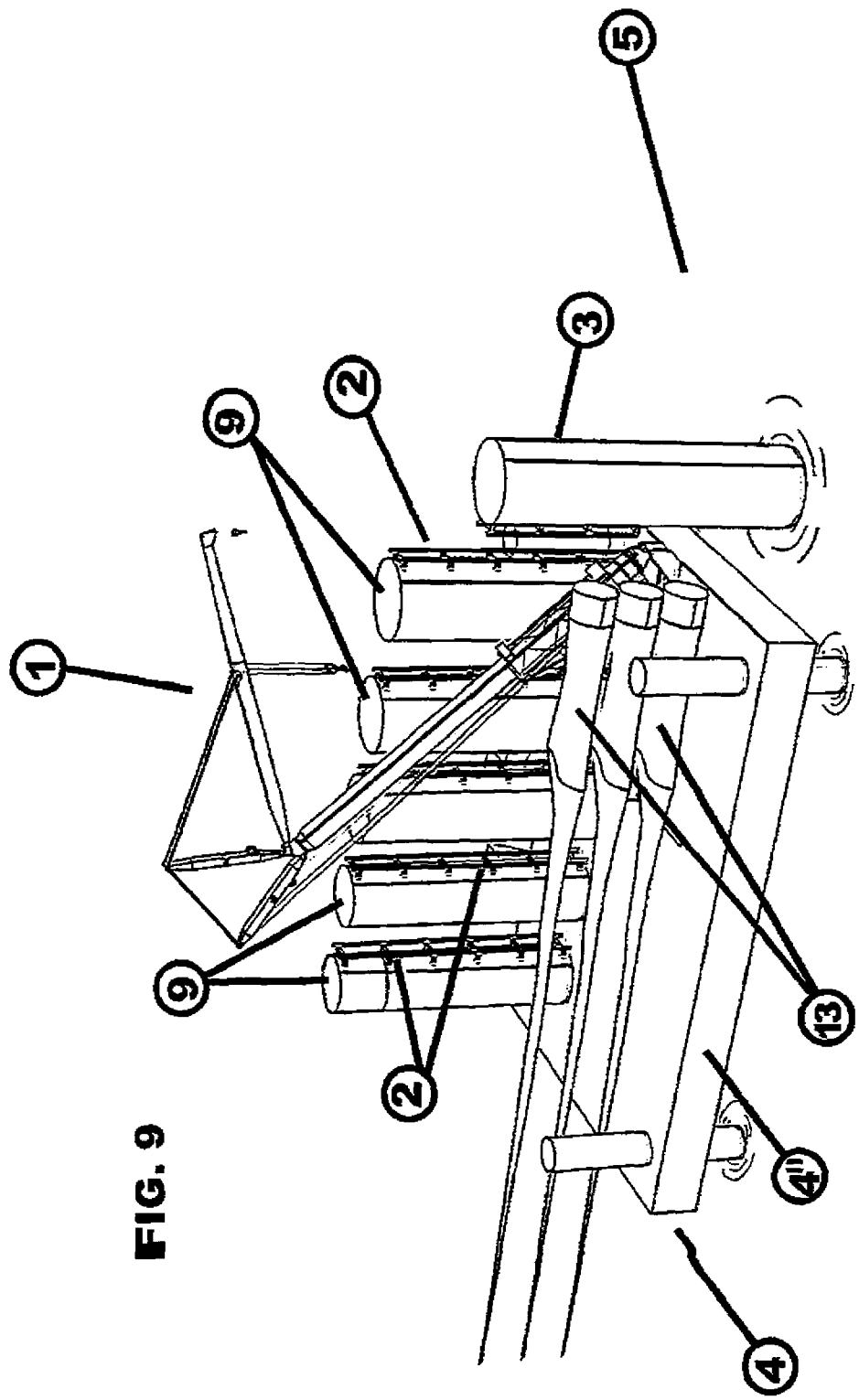

FIGS. 8 and 9 depict two alternative situations in which the vehicle 4 to be used for transporting the longitudinal parts 9 of the construction and the crane 1 in a horizontal position to the erection site 5 is different, notably either a floating vessel 4' (FIG. 8) or a jack-up vessel 4" (FIG. 9).

FIG. 8 shows a fully loaded floating vessel 4' after arrival at the construction site 5, and this Figure shows a moment during the initial up-ending of the crane 1 so as to enable its eventual mounting on the support and guide facility that is provided on the construction base 3 on which a windmill column will be completed.

Likewise FIG. 9 shows a fully loaded jack-up vessel 4" at the construction site 5, and shows a moment during the initial up-ending of the crane 1 so as to enable its eventual mounting on the support and guide facility that is provided on the construction base 3 on which a windmill column will be completed.

With reference to FIG. 8 and FIG. 9 it shows that besides the crane 1, also the longitudinal parts 9 of the construction that have already been provided off-site with support and guide facilities 2 for the crane 1, a windmill generator 10, and a hub 11 for mounting the rotor blades 13, and said rotor blades 13 can be moved to the erection site 5 on one and the same vehicle 4', 4".

The remainder of the explanation of using the crane 1 according to embodiments of the present invention for erecting the upstanding construction of the windmill will now be provided for the case that the vehicle is a jack-up vessel 4" in accordance with FIG. 9, but the skilled person will understand without further explanation that any other type of vessel could similarly be used for this purpose, and not necessarily only the alternative of the floating vessel 4' of FIG. 8.

Figure 10:
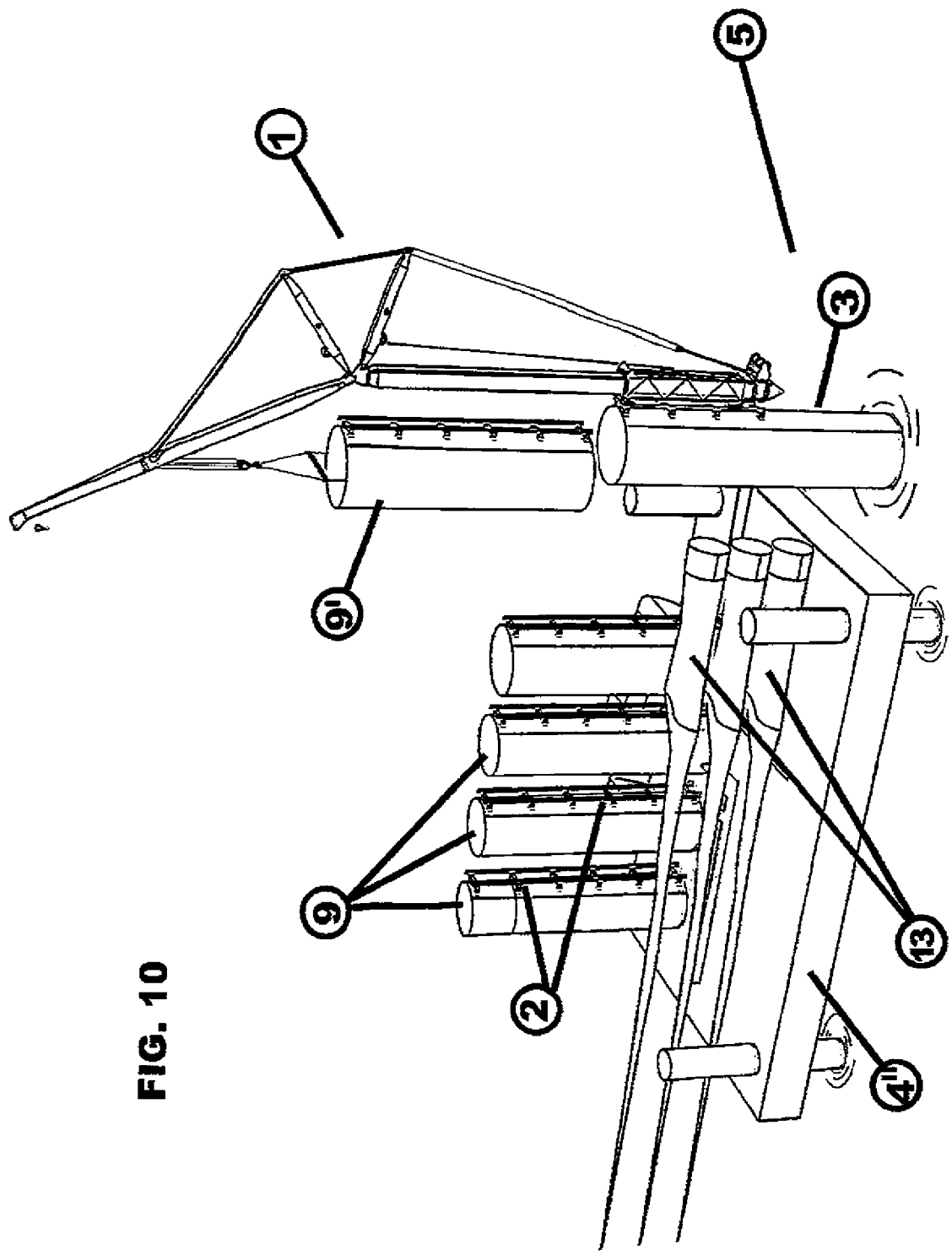

Turning now to FIGS. 10-15, these Figures show the consecutive building up and erection of the tower of longitudinal construction parts 9, wherein after mounting the crane 1 on the construction base 3 (in a way similar to what is discussed hereinabove with reference to FIGS. 1-7) a first construction part 9' is picked up by the crane 1 from the vessel 4" and positioned on top of the construction base 3. This is shown in FIG. 10.

Figure 11:
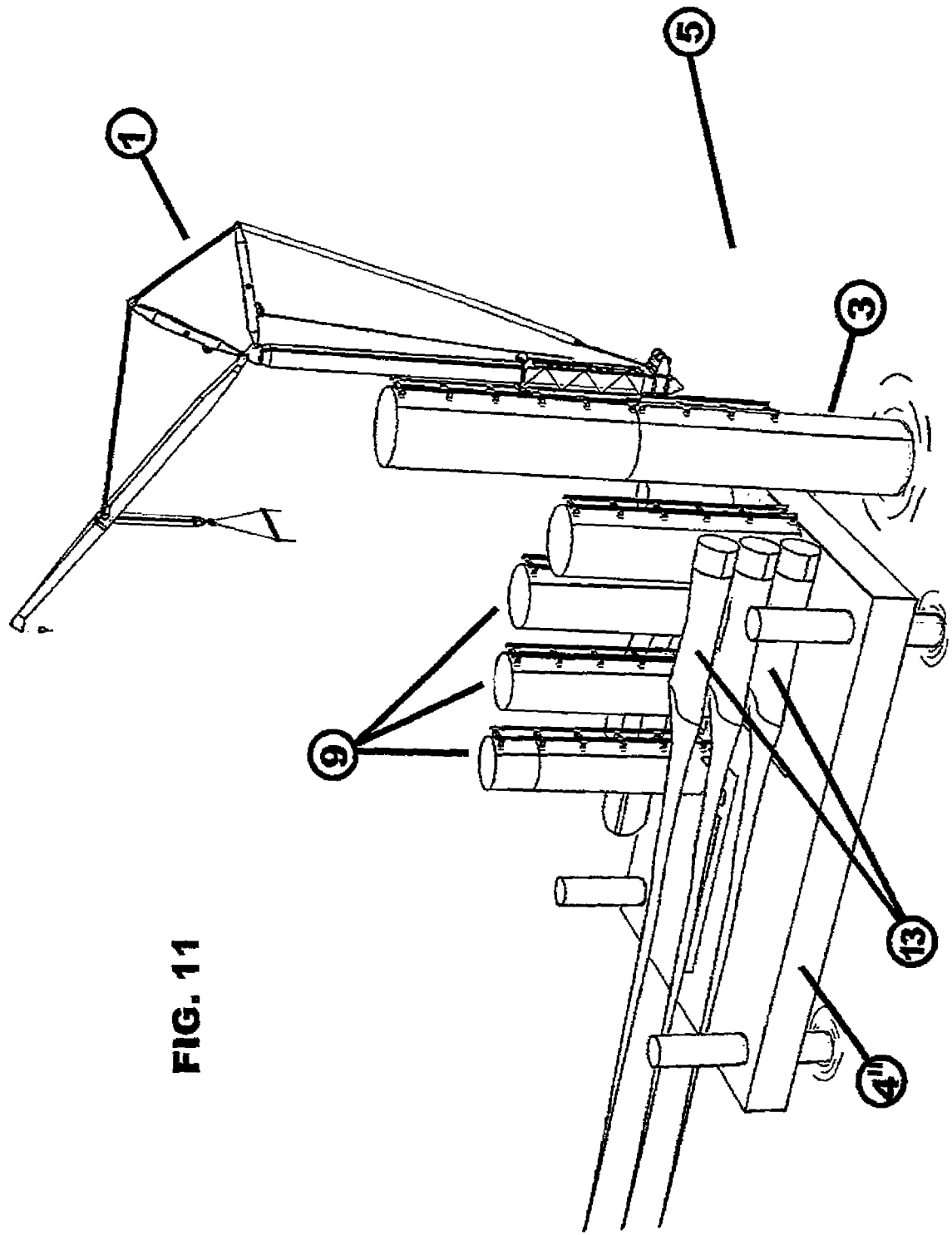

In FIG. 11 it shows that the crane 1 is moved to a higher altitude than in FIG. 10, until it reaches the top level 12 of the support and guide facility 2 of the then highest first longitudinal part 9' of the construction. This shows FIG. 12.

Figure 12:
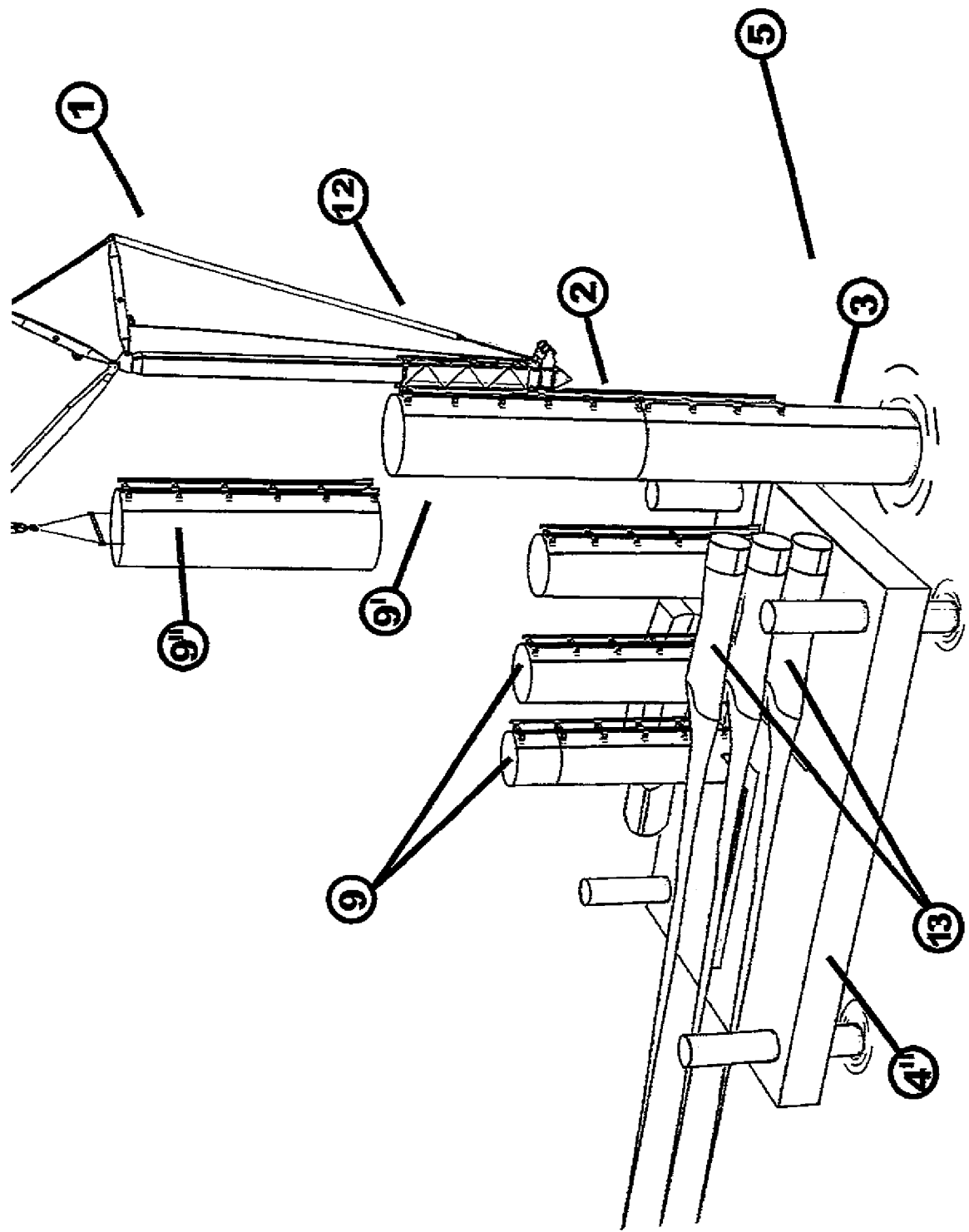

FIG. 12 further shows that a next longitudinal construction part 9" is picked up by the crane 1 from the vessel 4" and positioned on top of the first longitudinal construction part 9' that was earlier placed on the construction base 3.

Figure 13:
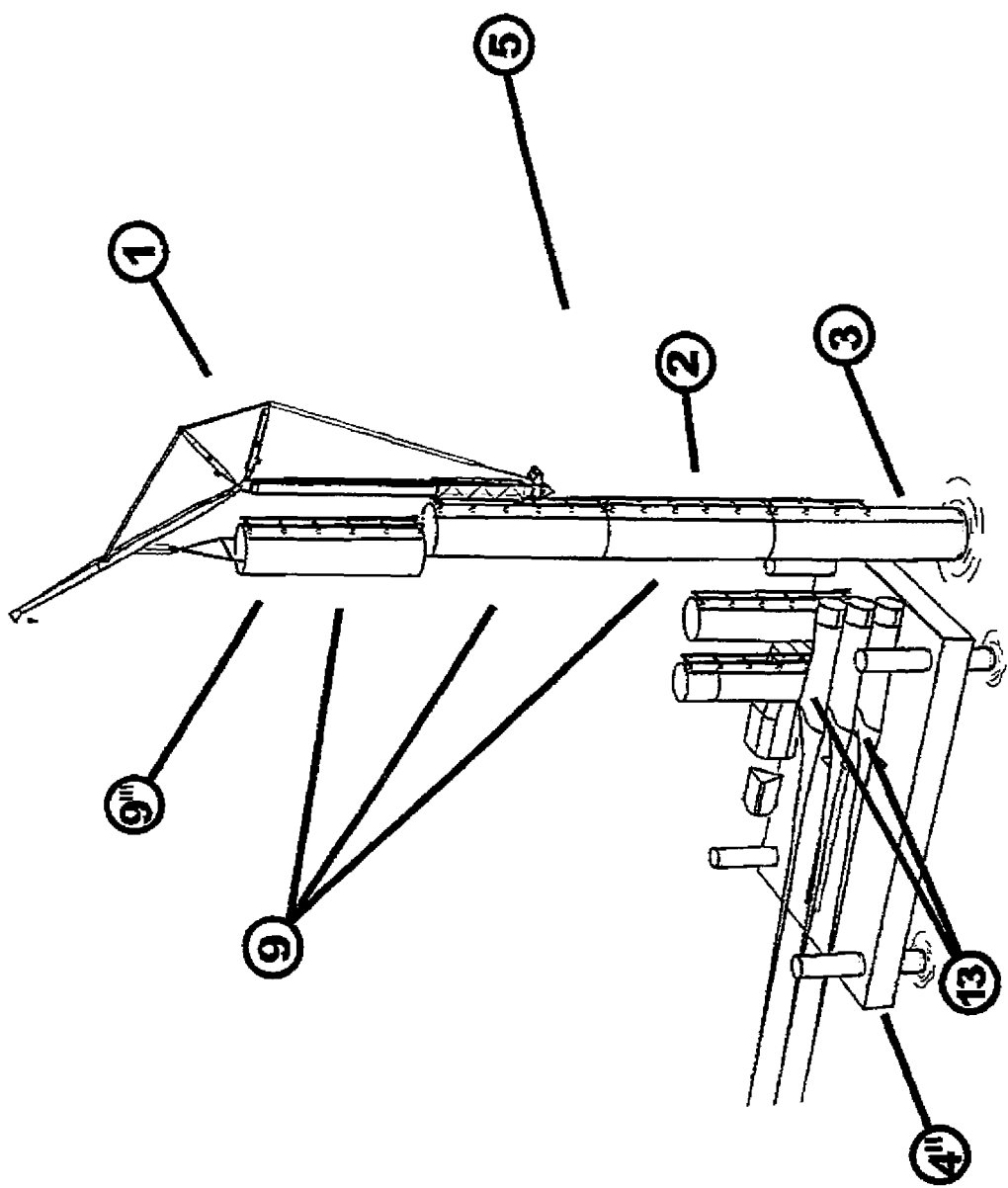
Figure 14:
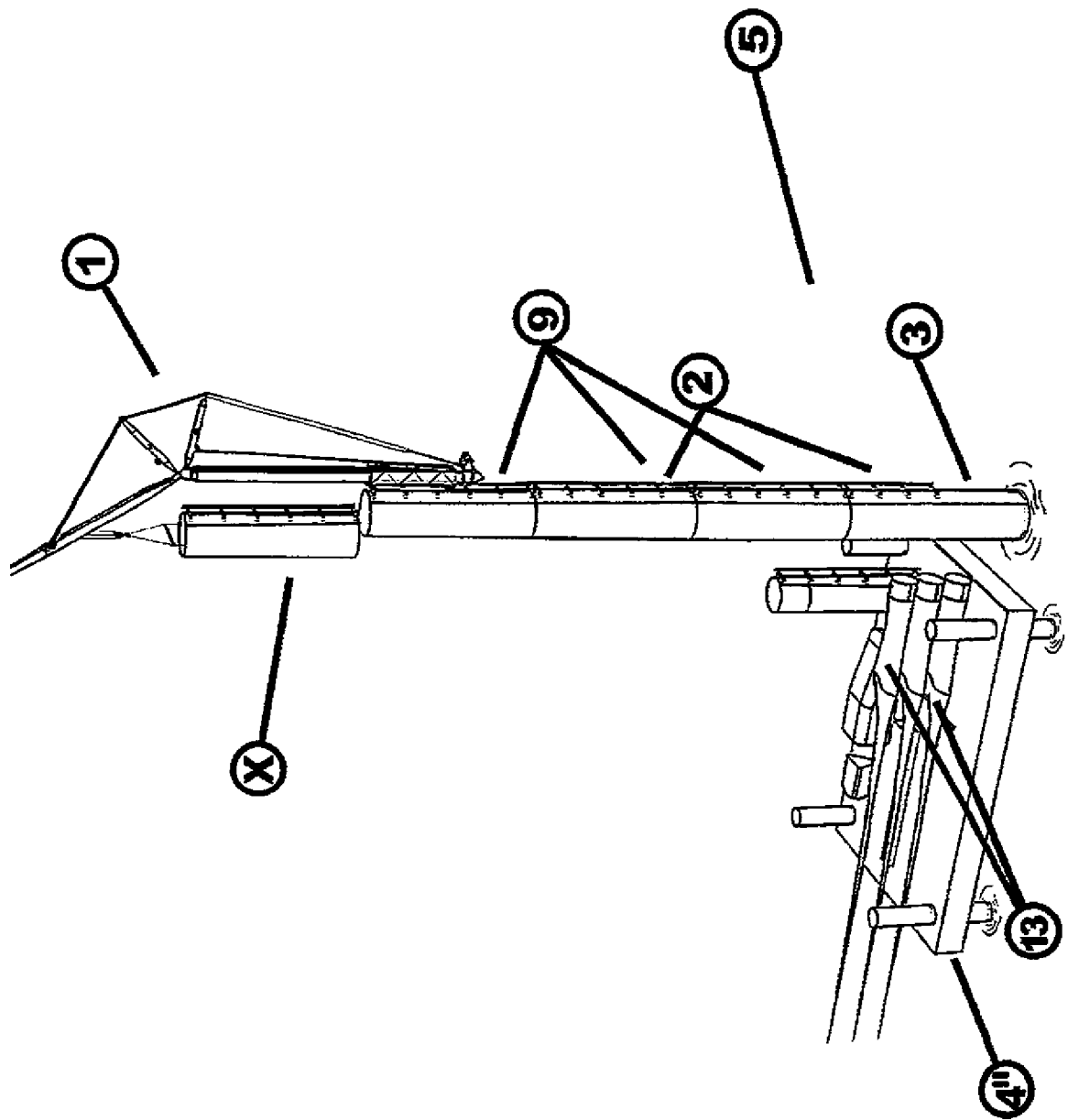
Figure 15:
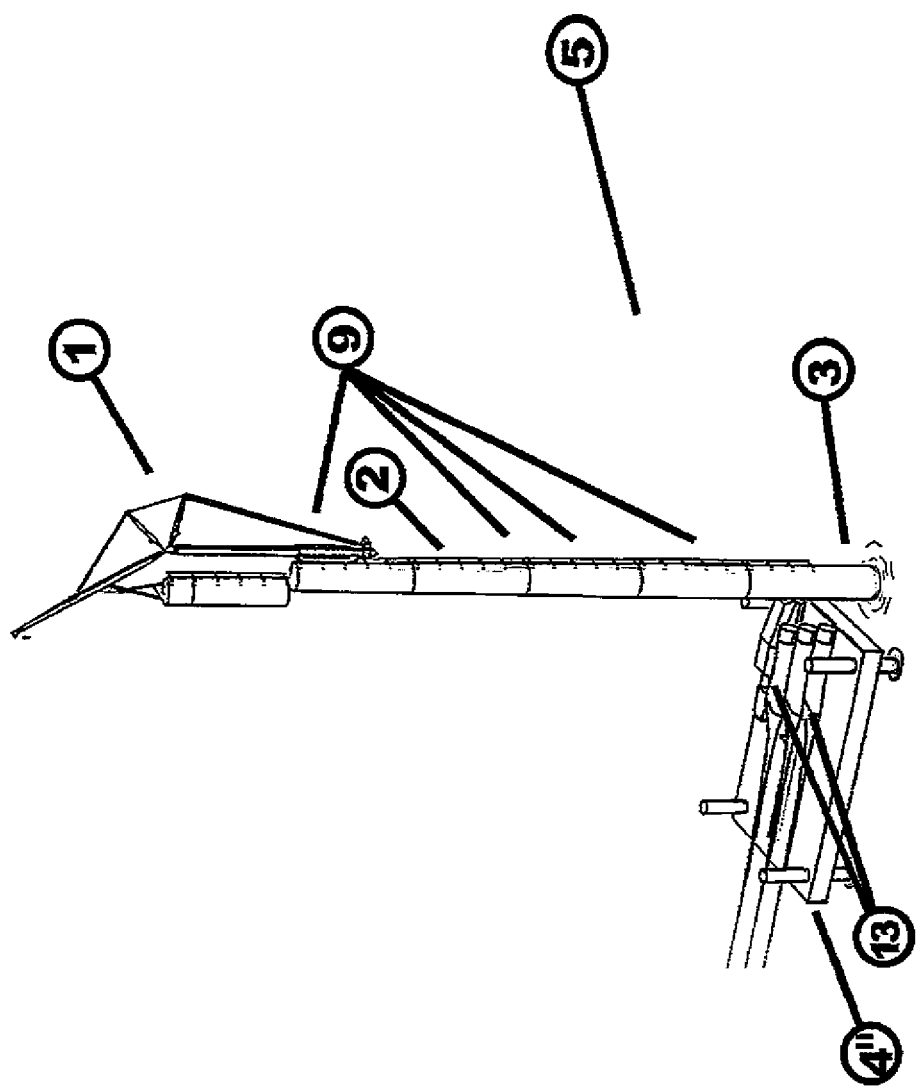

FIG. 13 shows a subsequent placement of a next yet still intermediate longitudinal construction part 9'" in the tower of construction parts 9, whereas FIG. 14 shows the generalization of the placement of construction part X in the tower of construction parts 9. Each intermediate placement of a construction part according to the building method of the invention can therefore be deemed illustrated by the generalization of placing construction part X in the tower of construction parts 9. FIG. 15 shows the final and uppermost longitudinal construction part being placed on top of the pile or tower of construction parts 9.

Figure 16:
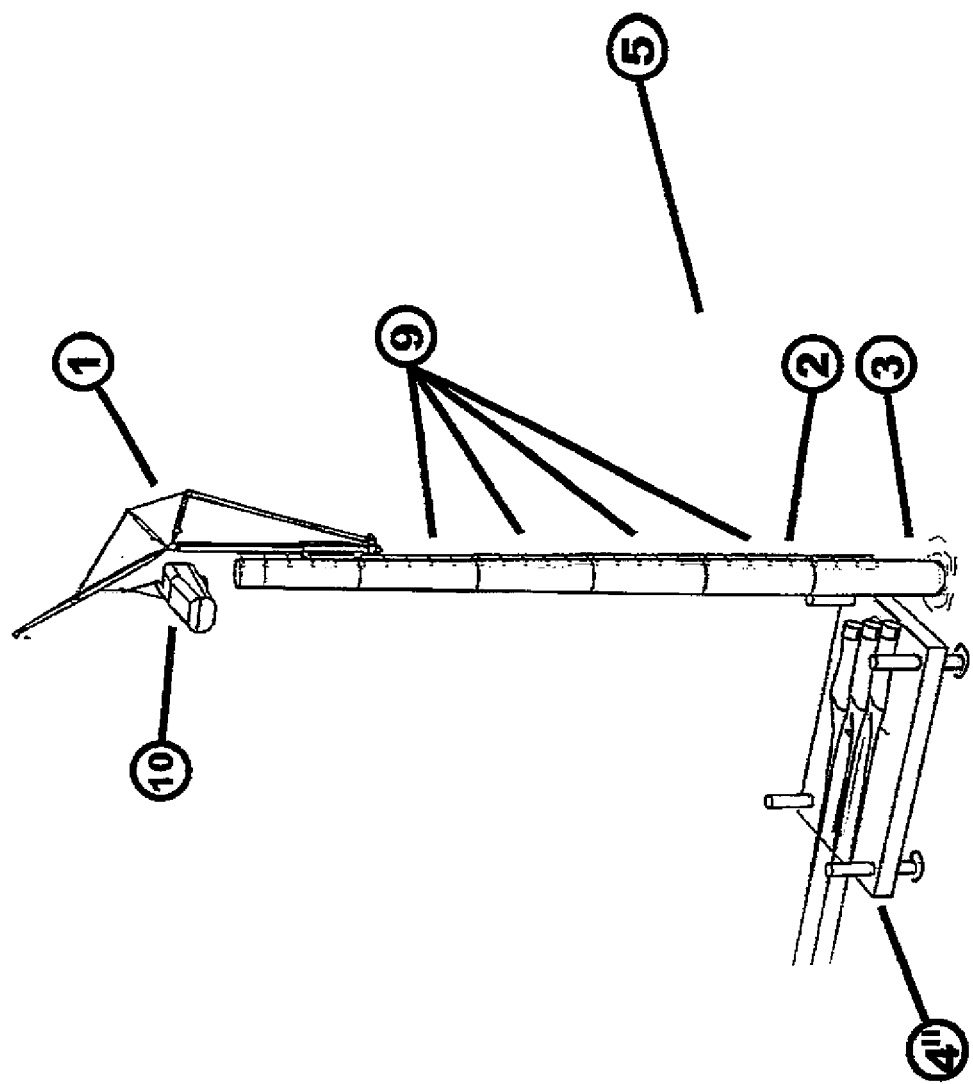
Figure 17:
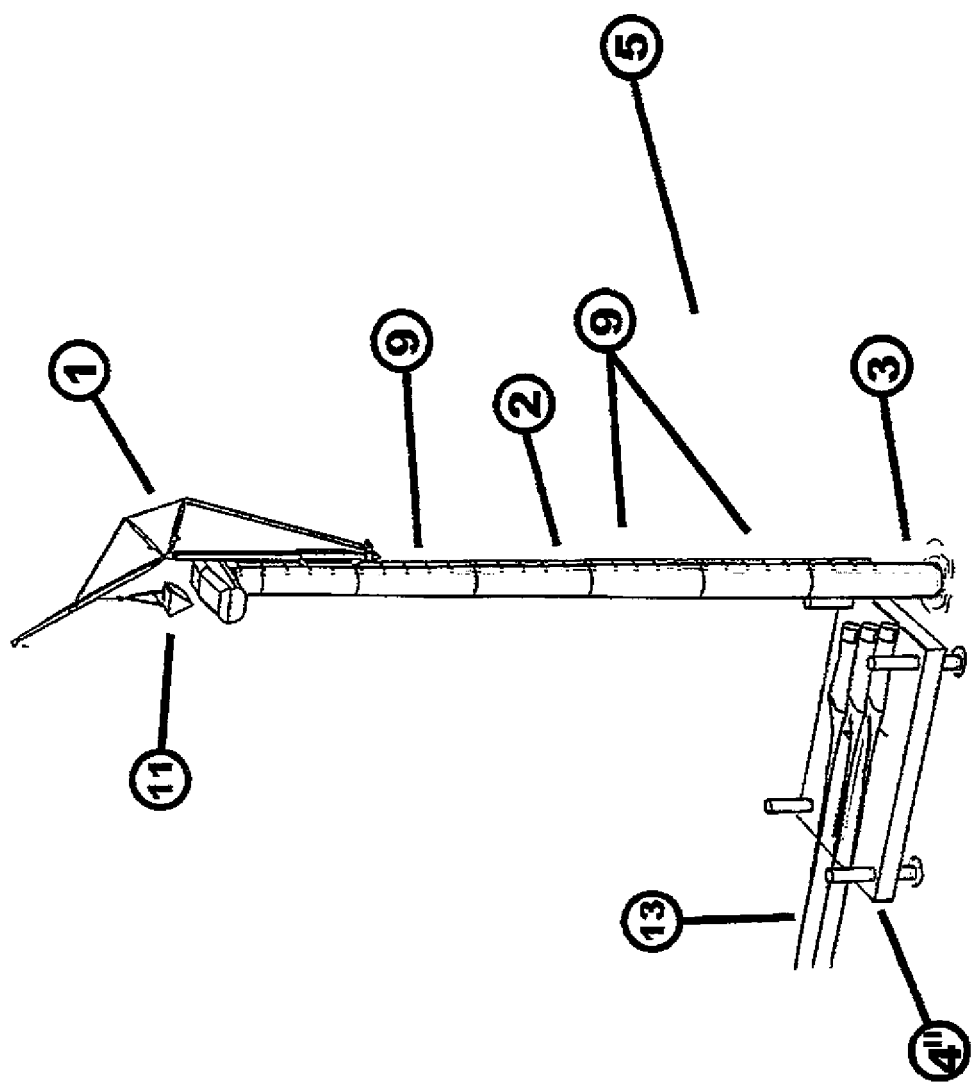

FIG. 16 and FIG. 17 depict respectively the placement after picking up from the vehicle 4" of the wind turbine generator 10 (FIG. 16), and the hub 11 for the rotor blades (FIG. 17).

Figure 18:
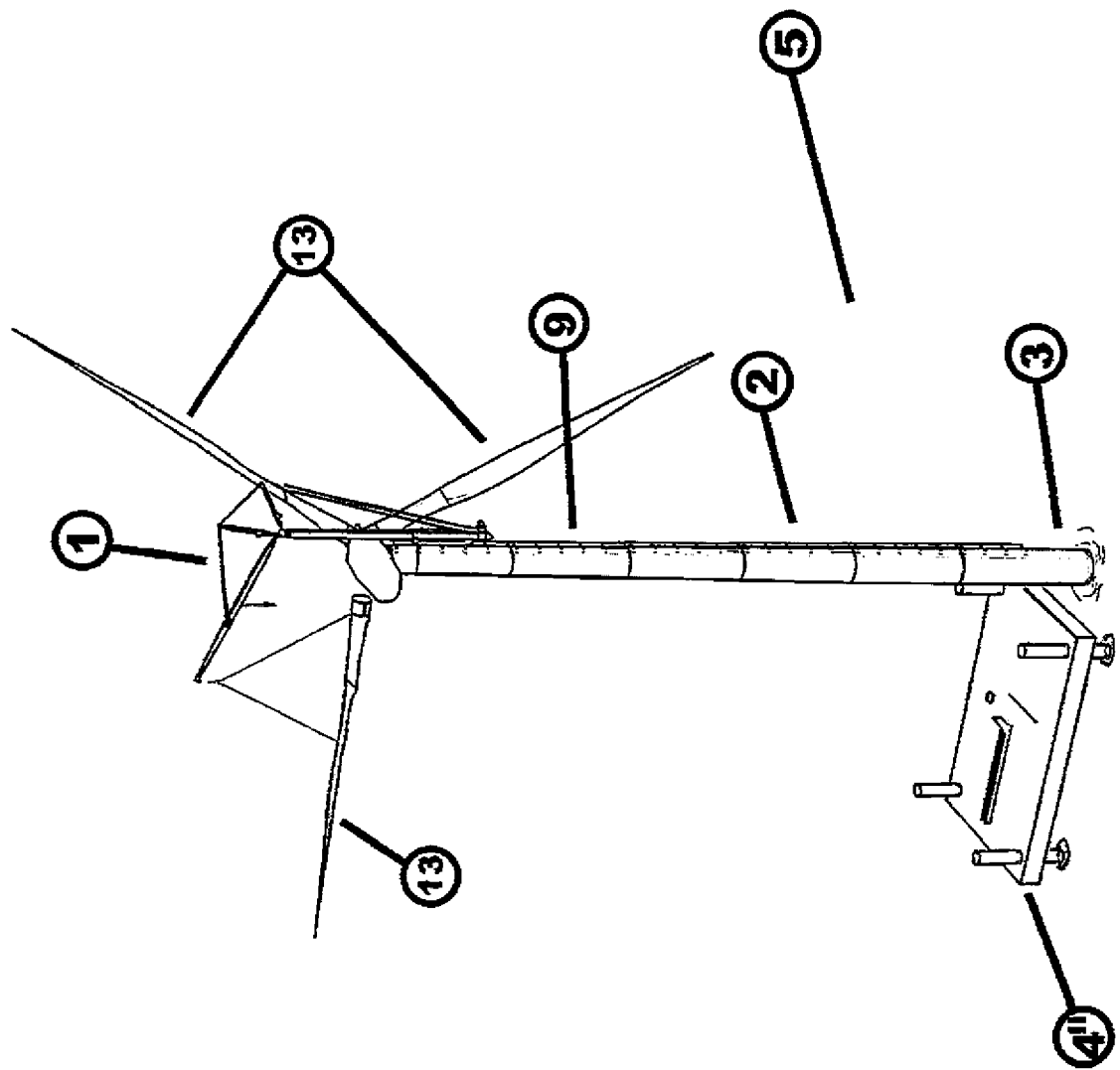

FIG. 18 shows the placement of the rotor blades 13, after their picking up from the vehicle 4", in their final mounted position on the hub 11.

With reference to FIGS. 19-25 the use of a second preferred embodiment of the crane 1 of the invention will be discussed for erecting an upstanding construction. The discussion hereinafter concentrates on the process of erecting the construction itself, without details regarding the supply of the construction parts 9 which is similar or the same as is shown with reference to FIGS. 8-9. For reasons of brevity repeating this discussion is avoided.

Turning now to FIGS. 19-25, these Figures show the consecutive building up and erection of a tower of longitudinal construction parts 9', 9" on a construction base 3.

Figure 19:
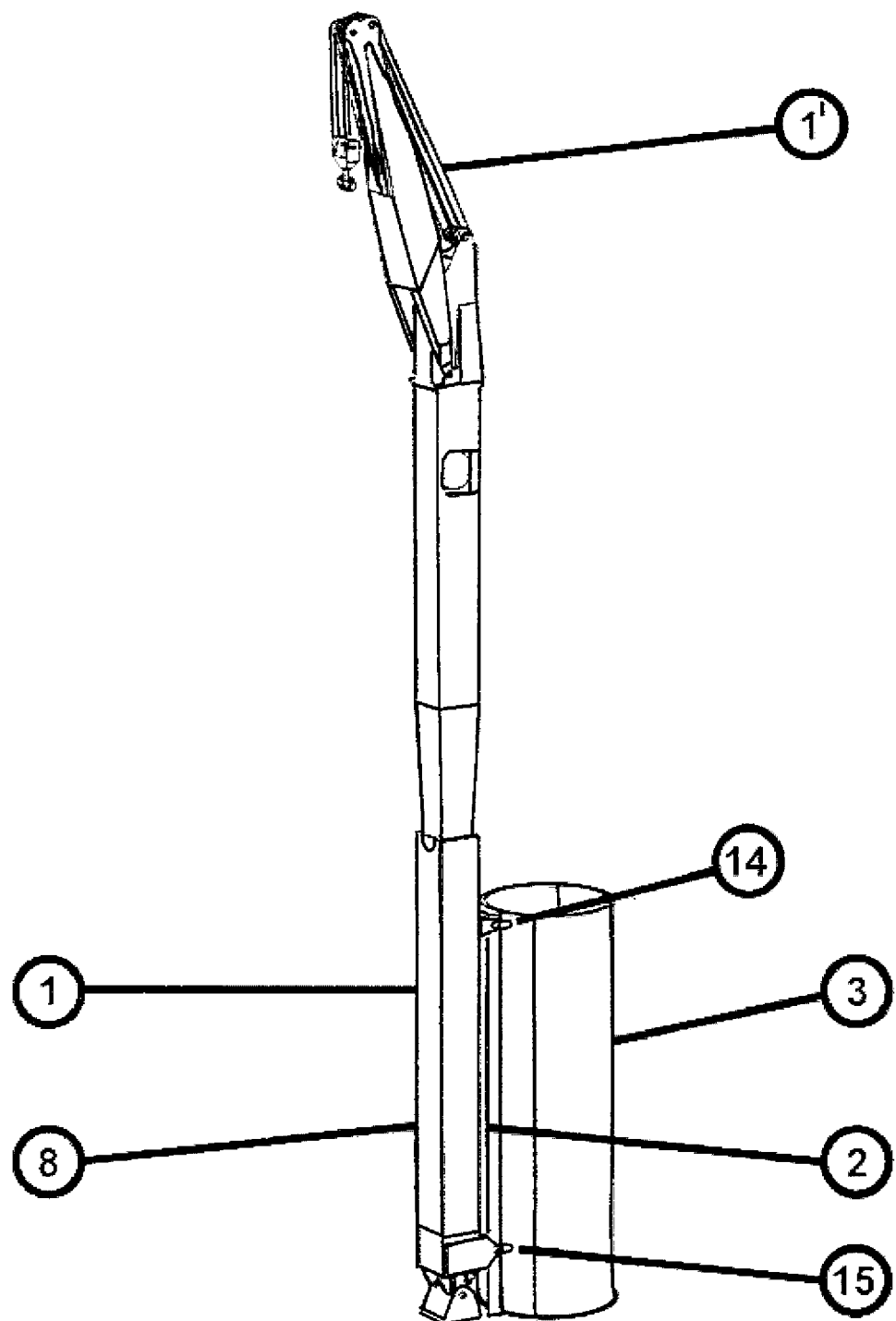
FIGS. 19-25 illustrate a method of erecting an upstanding construction comprising longitudinal construction parts using a crane according to an embodiment of the present invention.

FIG. 19 shows that the mast 8 of the crane 1 is provided with an upper mounting slide 14 and a lower mounting slide 15 for cooperation with the vertical support and guide facility 2 on the construction base 3. In the following Figures it will be shown that on behalf of erecting the tower of construction parts 9', 9" on top of the construction base 3, the mast 8 is telescopically extendable between the upper and lower mounting slides 14, 15.

Figure 20:
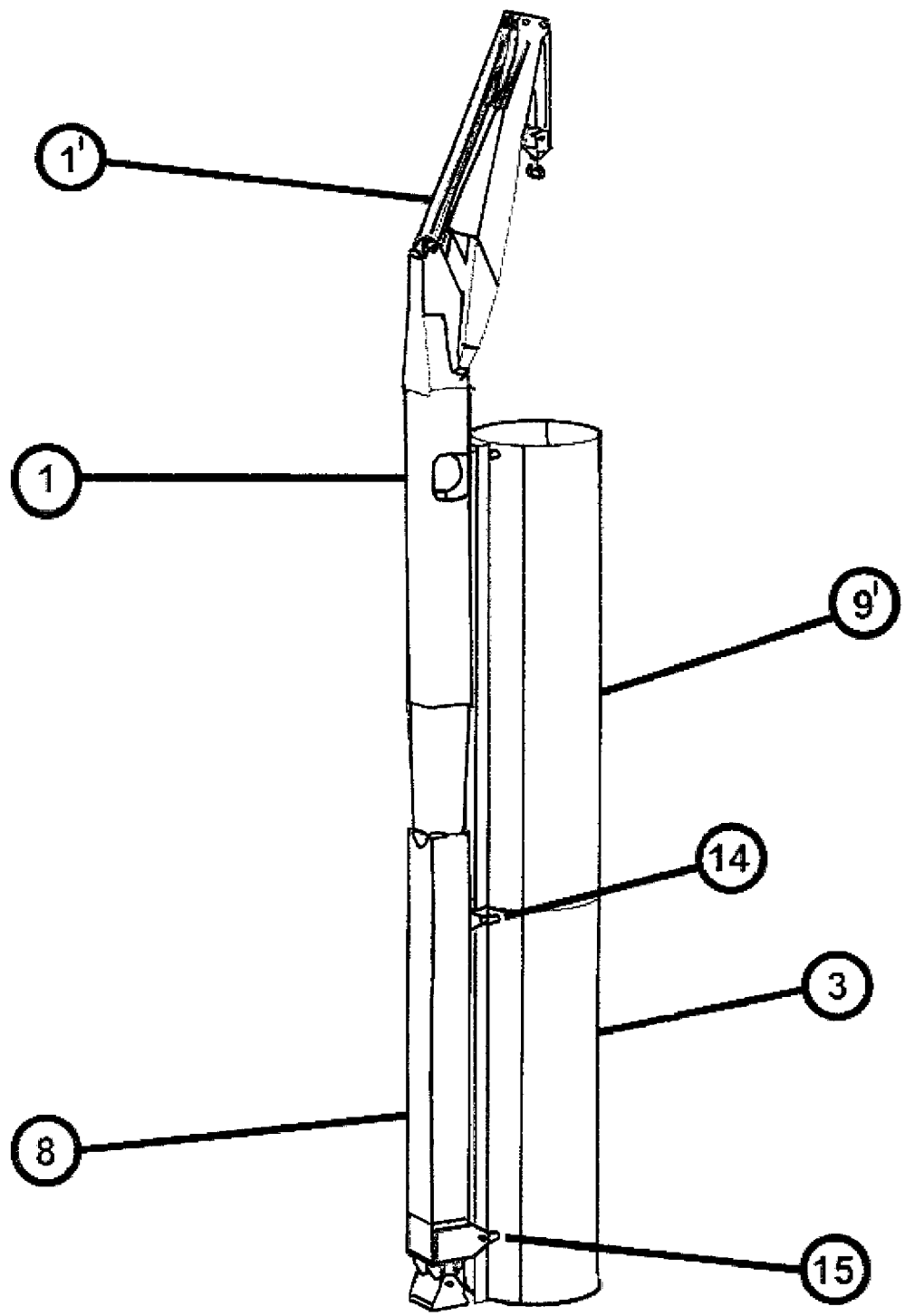

As is shown in FIG. 19 the upper mounting slide 14 is positioned slightly below an upper end of the construction base 3, and the lower mounting slide 15 is positioned at a lower end of the base part 3. After thus having the crane 1 mounted on the construction base 3 (in a way similar to what is discussed hereinabove with reference to FIGS. 1-7) a first construction part 9' which is picked up by the crane 1 is positioned on top of the construction base 3. This is shown in FIG. 20.

Figure 21:
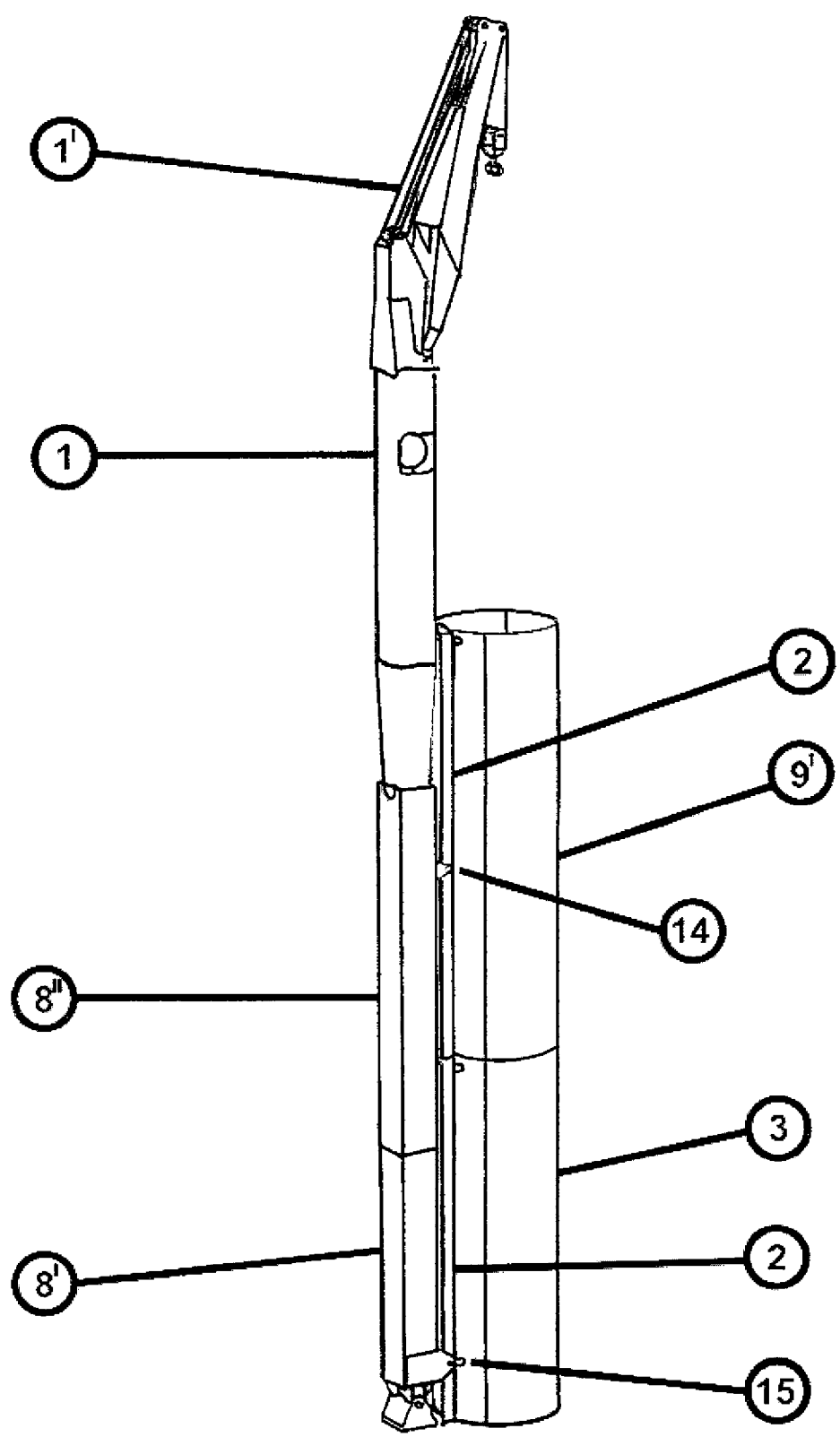

Thereafter FIG. 21 shows a next step wherein the mast 8 is telescopically extended such that the extremities of the mast parts 8' and 8" move away from each other. Because upper mounting slide 14 is connected to the upper mast part 8", the upper mounting slide 14 moves along the support and guide facility 2 which is present on the first longitudinal construction part 9' which has just been placed on top of the construction base 3. At the same time the lower mounting slide 15 temporarily maintains its position on the supporting guide facility 2 present on the construction base 3.

Figure 22:
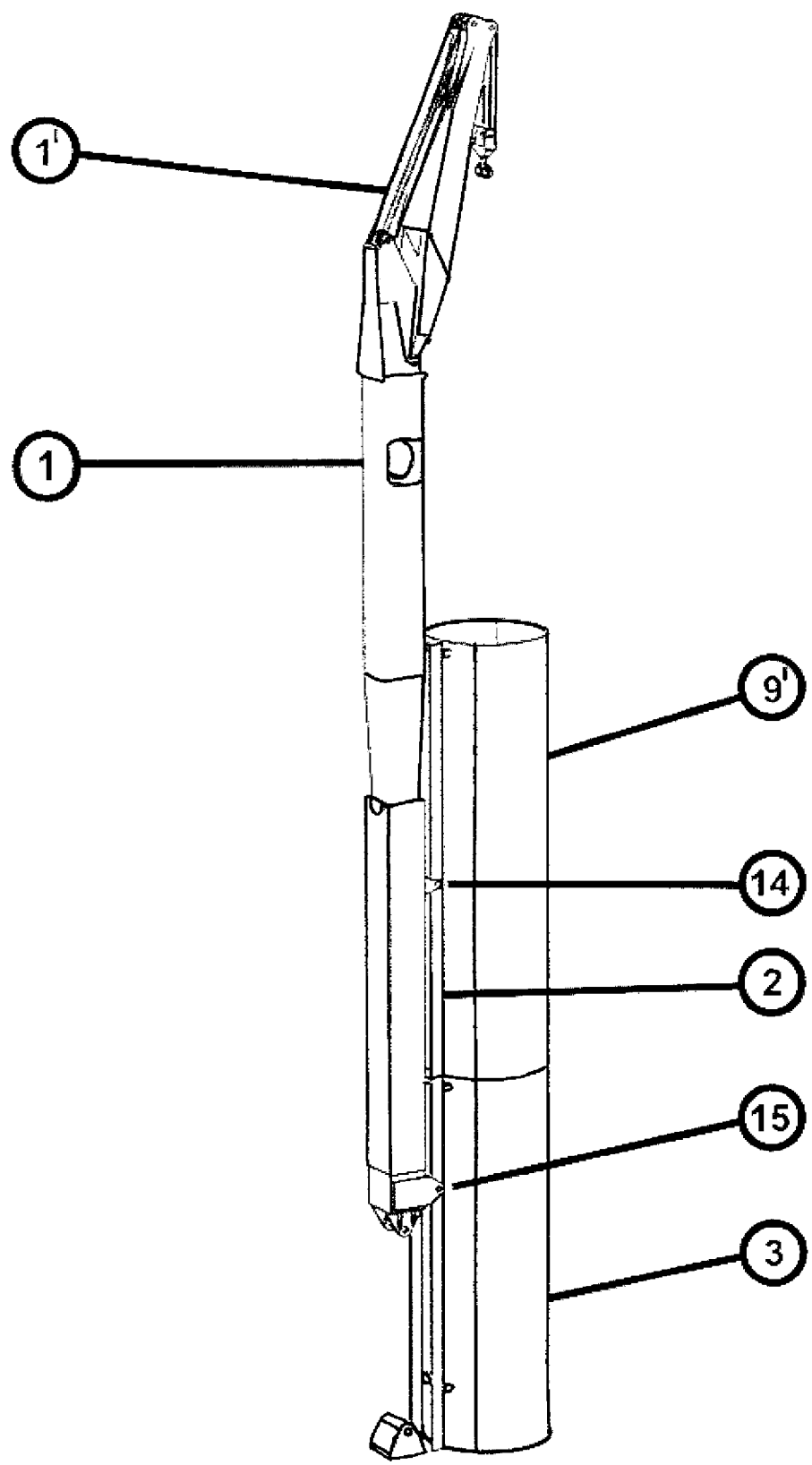
Figure 23:
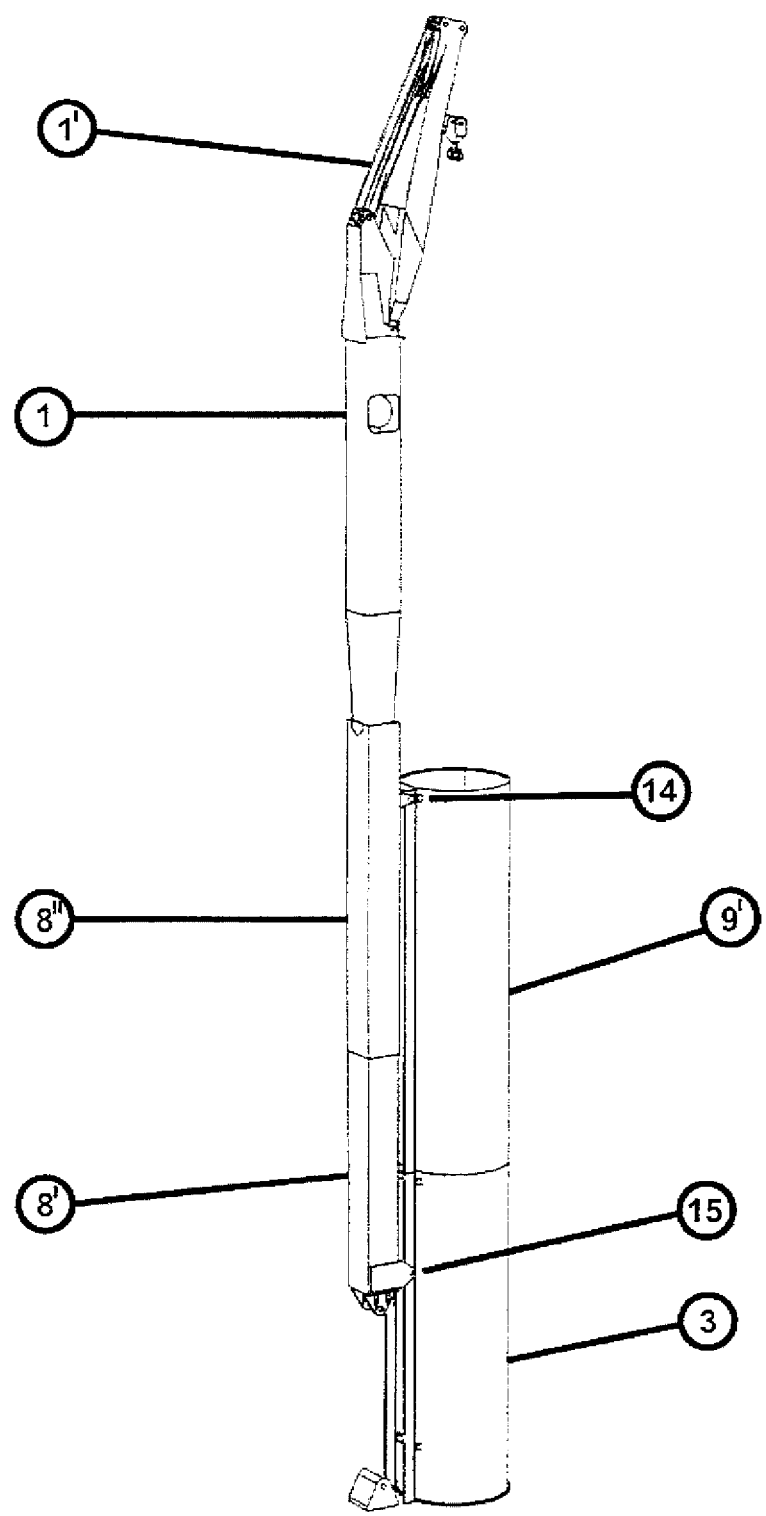
Figure 24:
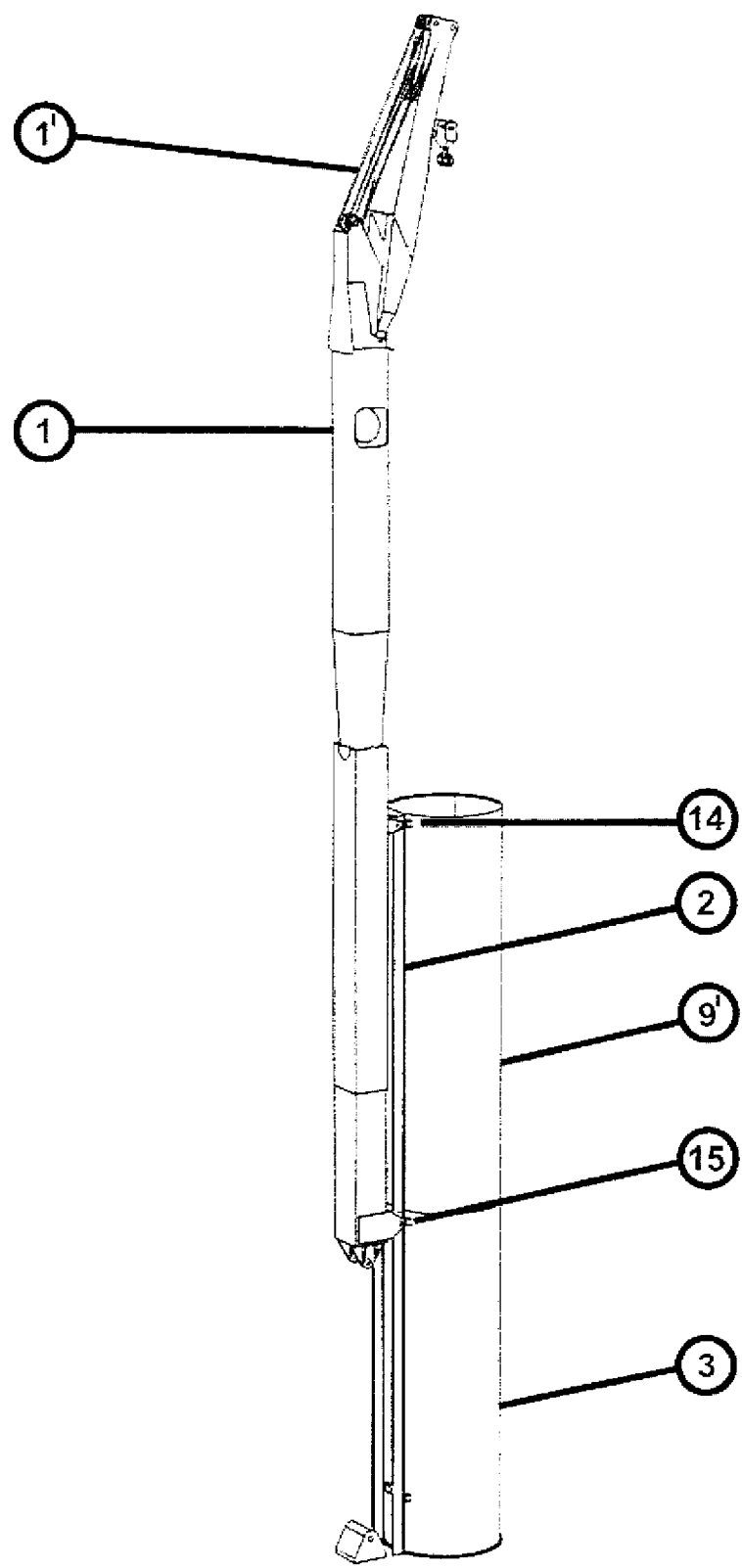
Figure 25:
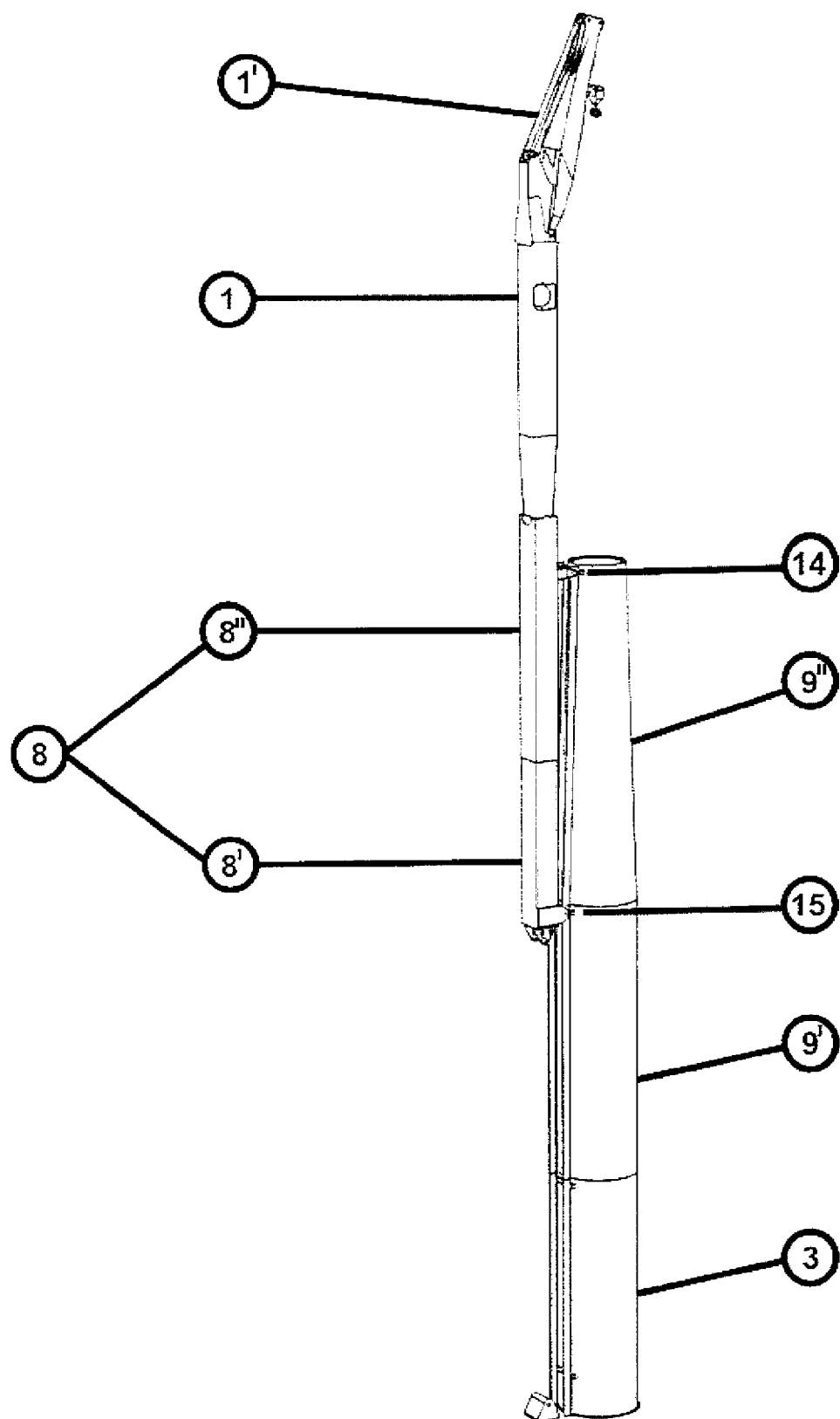

FIG. 22 shows then that subsequently the mast parts 8', 8" are retracted so that the distance between the mounting slides 14, 15 diminishes and the lower mounting slide 15 assumes a higher than initial position on the supporting guide facility 2 present on the construction base 3. This enables that the mast 8 and its mast parts 8', 8" again telescopically extend from each other so that—as shown in FIG. 23—the upper mounting slide 14 assumes a position slightly below an upper end of the then highest longitudinal construction part 9', in preparation of the placement of a further longitudinal construction part 9" on top of the current highest longitudinal construction part 9'. Before such further longitudinal construction part 9" is placed, the lower mounting slide 15 is manipulated into a desired position as depicted in FIG. 24 which best accords to a desired flow of forces from the crane 1 into the supporting guide facility 2. At that time the crane 1 is ready to pick up and place the further longitudinal construction part 9" on top of the up to then highest longitudinal construction part 9', whereafter subsequently the upper mounting slide 14 and the lower mounting slide 15 can be moved to a new position by appropriately longitudinally extending the mast parts 8' and 8" from each other. This is shown in FIG. 25.

The placement of the wind turbine generator, and the hub for the rotor blades can follow similarly as is explained hereinabove with reference to FIGS. 16-18.

FIGS. 26-50 show views of the third embodiment and illustrate the use thereof. In the following, only the aspects in which this embodiment differs from the first and second embodiment will be described. It will be apparent that in all other aspects, the methods and concepts described above may be applied to this third embodiment.

In the third embodiment, the crane 1 comprises the vertical support and guide facility 2', and the construction parts are provided with attachment or fixation points which can cooperate with the vertical support and guide facility 2' to releasably attach the facility to the stacked segments of the upstanding construction. Thus, the vertical support and guide facility 2' is provided at the same time as the crane 1. This allows to reduce the size and dimensions of the support and guide facility, as well as the time and effort needed to erect and install the crane. Additionally, the need to already provide the longitudinal parts 9 off-site with support and guide facilities is obviated as well.

In this third embodiment, the vertical support and guide facility 2 is movable up and down along the upstanding construction. This allows to use a vertical support and guide facility 2' which is shorter than the upstanding construction to be erected, and e.g. which has substantially the same length (in its longest position) as the mast 8 of the crane or is shorter. For example, this allows to use a vertical support and guide facility 2' which is not longer than two or three longitudinal parts of the construction.

Figure 26:
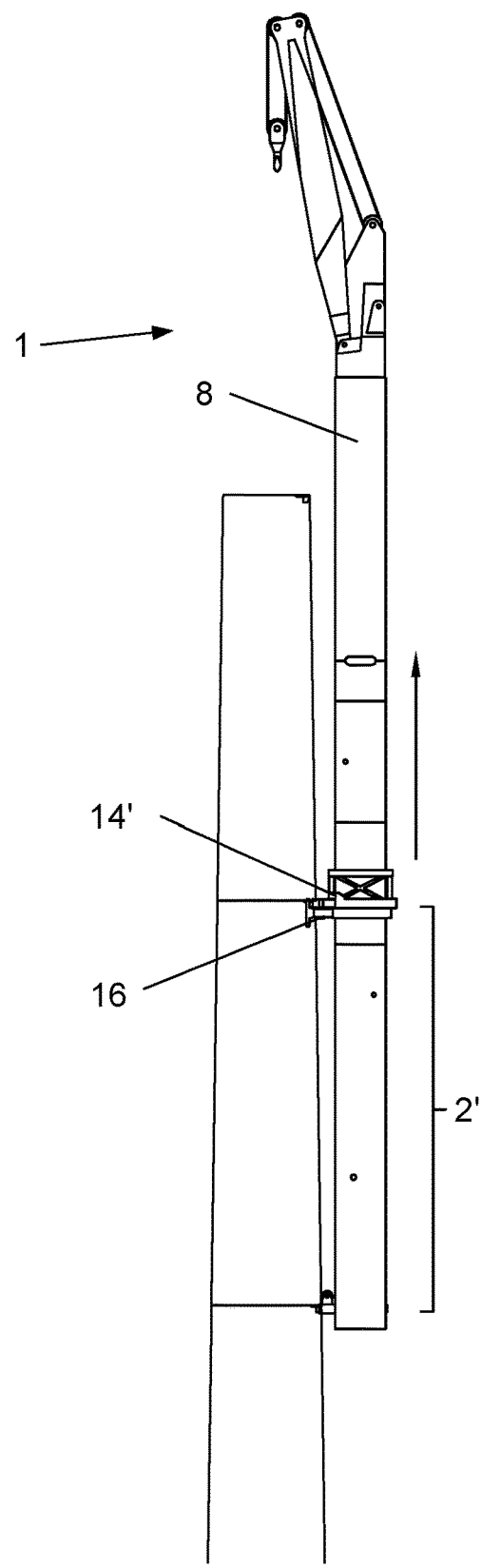
FIGS. 26-30 illustrate a method of erecting an upstanding construction comprising longitudinal construction parts using a crane according to an embodiment of the present invention.

FIG. 26 shows a mast 8 which, contrary to the second embodiment, is not telescopically extendable. However, it will be apparent that the mast of the second embodiment may be used as well with the vertical support and guide facility 2 of the third embodiment. The vertical support and guide facility 2 is releasably fixated to the upright construction and can move relative thereto, to move up or down the construction. The mast 8 in turn is movable relative to the facility 2', and can thus move up or down relative to the construction as well, e.g. when the facility 2 is fixated, as explained below in more detail.

The vertical support and guide facility 2 preferably comprises mounts 14',15',16 releasably attachable to the upstanding construction and attached to the mast 8 in such a manner the mast 8 is movable up and down along the upstanding construction when, at least some of, the mounts are attached to the upstanding construction. The movement of the mast 8 is thereby guided by the mounts 14', 15', and 16. Vice versa the mast 8 provides a guide bar for the movement of some of the mounts relative to the construction parts 9.

FIG. 26 shows that the mounts can comprise a lower mount 15', an upper mount 14' and an intermediate mount 16 between the lower mount and the upper mount. The intermediate mount 16 is displaceable between the lower mount and the upper mount in opposite directions along the longitudinal direction of the mast. In this example the path over which the intermediate mount can move ranges from the lower mount to the upper mount but it will be apparent that, depending on the specific implementation, a shorter path may be used as well.

In addition to the intermediate mount 16, one or more of the upper mount 14' and/or the lower mount 15' can be a displaceable mount. This mount can be displaceable, relative to the mast, between the intermediate mount and an extremity of the mast, in opposite directions parallel to the longitudinal direction towards and away from the extremity. Thus, the length of the facility 2, i.e. the distance between the most remote mounts 14' and 15' can be varied to expand and retract in such a manner that the facility is moved up and/or down relative to the construction 9. For example, starting from a retracted state, the facility may expand at one end thereof in a first direction and subsequently retract at the other end, thus moving the other end in the first direction and thus the facility 2' be moved.

The mounts can be releasably attached to construction parts 9, 9'. As shown in more detail in FIGS. 31-36, in this embodiment, construction parts 9, 9' are provided with respective fixation points for the mounts, and more specifically at their top end. The fixation points are distributed circumferentially around the construction parts 9, 9' such that one mount can be attached at two circumferentially spaced apart positions at the same height. This provides for a stable releasable fixation which can resist horizontal forces in tangential direction of the construction part 9 to which the mount is attached.

In this third embodiment, the position of the lower mount 15' is fixated relative to the mast, at the lower extremity of the mast 8, although another position may be used. In this example, the weight of the crane is mainly or completely carried by the lower mount 15'. This avoids the corresponding vertical force being transferred on unfinished parts of the structure to be build.

The upper and intermediate mounts 14', 16 transfer horizontal forces exerted on the mast to the upstanding construction and hold the mast in position horizontally, when attached to the construction of course. The mounts 14' and 16 in this example both have a passage, as more clearly seen in FIGS. 31-36 through which the mast 8 slidably extends and which thus do not bear the weight of the mast but ensure that the mast 8 is held in position horizontally, i.e. in tangential and radial direction of the construction parts 9 and 9', when not moving and guide the movement of the mast.

The support and guide facility 2' may be lowered or raised as follows. FIG. 26 shows the crane 1 in an initial position. In this initial position, the mounts 14', 15' and 16 are attached to the second and third highest longitudinal construction parts 9. More specific, lower mount 15' is attached to an upper or top end of the third highest longitudinal construction part 9 whereas upper mount 14' and intermediate mount 16 are attached to a top end of the second highest longitudinal construction part 9.

Figure 27:
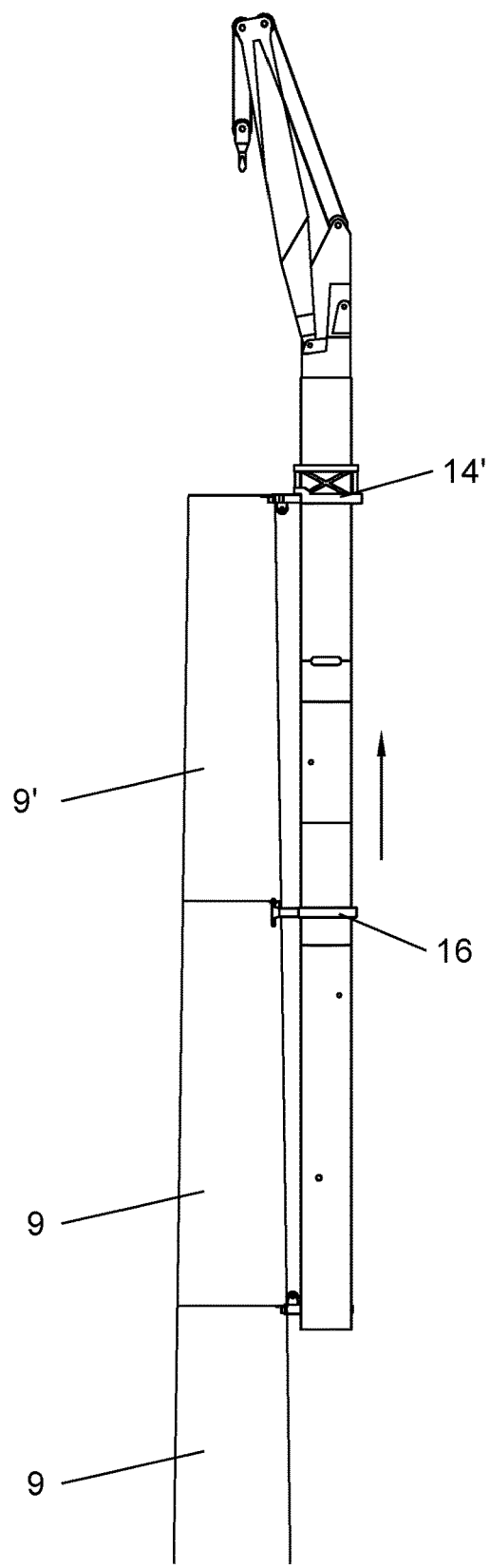

FIG. 26 shows that the attachment of the upper mount 14' is released and, as the arrow indicates, the upper mount 14' is displaced along the mast to the top or upper end of the currently highest longitudinal construction part 9'. FIG. 27 shows that the upper mount 14' is then attached to the top end of the now highest longitudinal construction part 9'.

Subsequently, the attachment of intermediate mount 16 to the top end of the second highest longitudinal construction part 9 is released. The intermediate mount 16 is then, as indicated with the arrow, moved upwards to be attached to the same fixation as before but instead of engaging from underneath now engages from above with the upper end of the second highest longitudinal construction part 9. The length of the facility 2' now corresponds to about two construction parts, and hence is expanded relative to FIG. 26 where the length corresponds to about one construction part.

Figure 28:
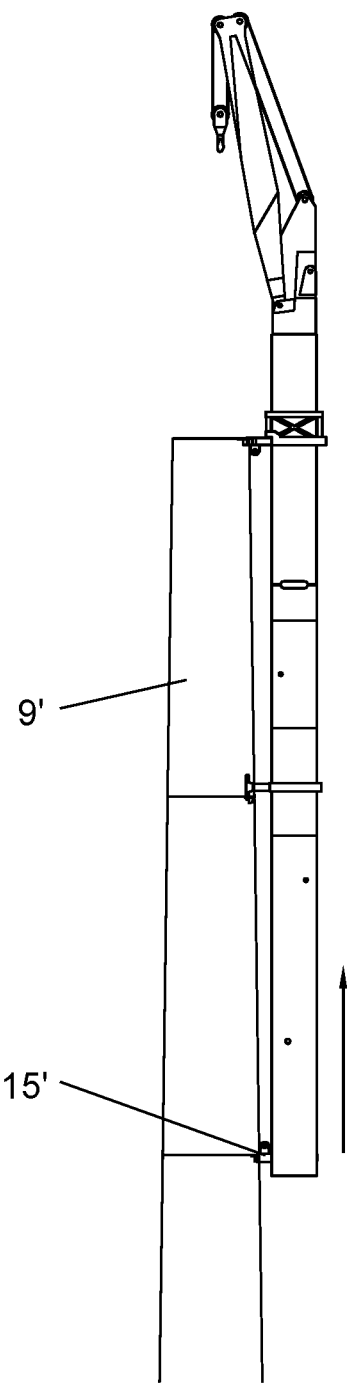
Figure 29:
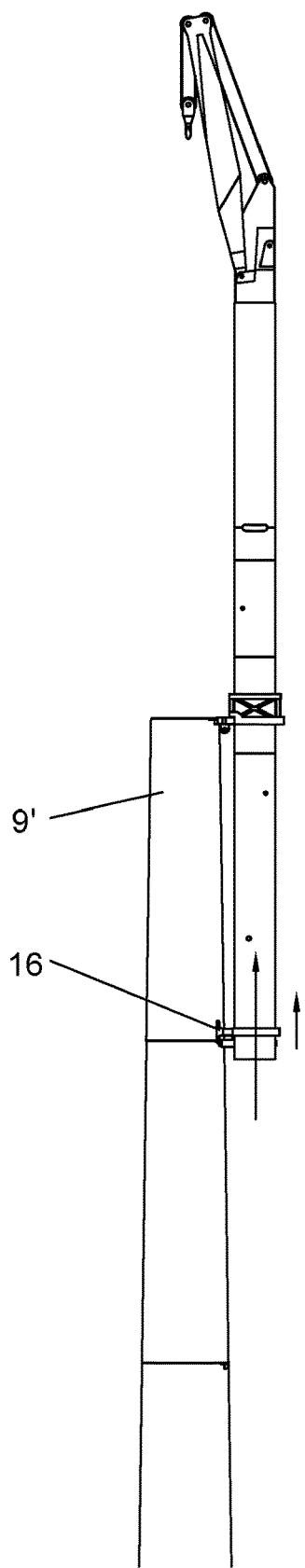

FIG. 28 shows that thereafter the attachment of the lower mount 15' to the construction part is released. The mast 8 can then be moved upwards, guided by the upper mount 14' and intermediate mount 16 (which are both attached and thus fixated relative to the construction parts 9 and 9'). FIG. 29 shows that after thus raising the mast 8, the lower mount 15' is attached again, but now to the top end of the second highest longitudinal construction part 9, and the facility 2' now extends over about one construction part.

Figure 30:
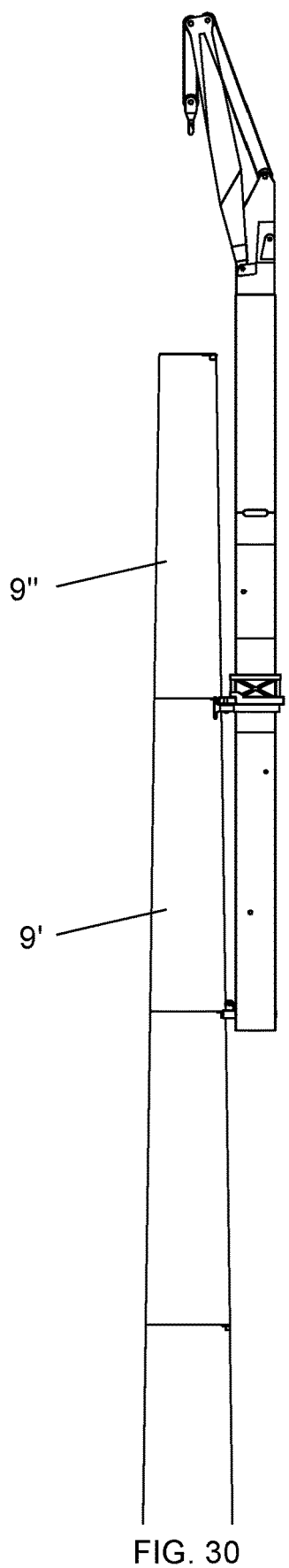

The intermediate mount 16 is subsequently moved to the top end of the now highest longitudinal construction part 9' and attached thereto, which FIG. 30 shows. This strengthens the attachment of the facility at the top.

The crane 1 is now in its new position and a next longitudinal construction part 9" can be placed. FIG. 30 shows that the next longitudinal construction part 9" is placed on top of the currently highest longitudinal construction part 9' and thus becomes the next highest longitudinal construction part.

FIGS. 31-36 show in more detail how the mounts 14', 15', 16 are attached to the upstanding structure. Each of the mounts comprises a fixation system for releasably attaching to the upstanding construction simultaneously at different fixation points which in circumferential direction of the upstanding construction are spaced apart but at substantially the same height.

The upper mount 14' and lower mount 15' have similar fixation systems and the intermediate mount 16 has a fixation system which differs therefrom, for engaging at fixation points different from the upper mount and lower mount.

Figure 31:
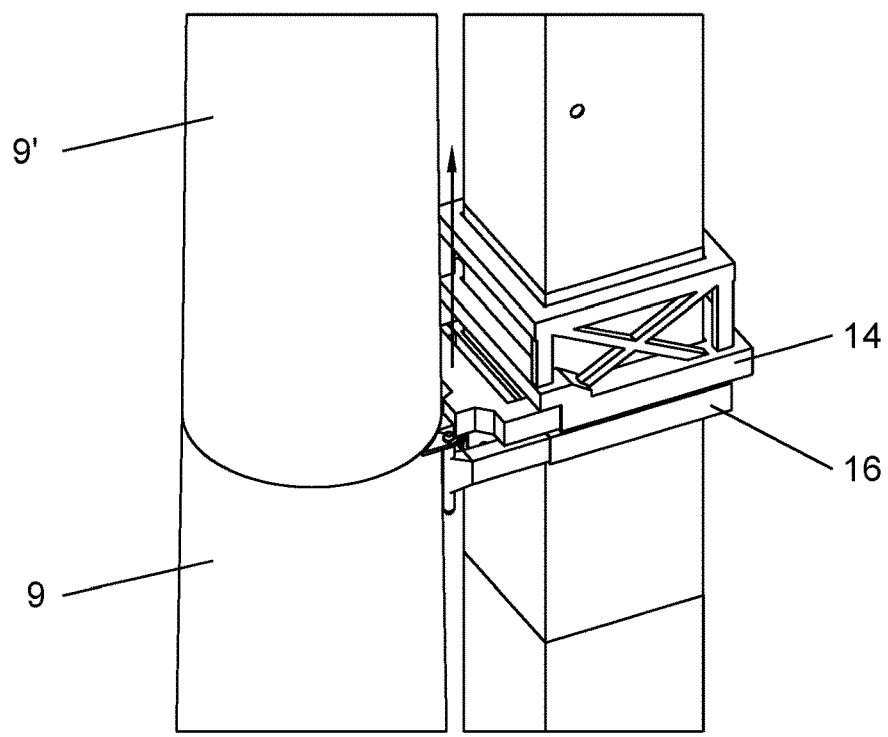
FIGS. 31-36 illustrate a releasable attachment of an intermediate mount according to an embodiment of the present invention.
Figure 34:
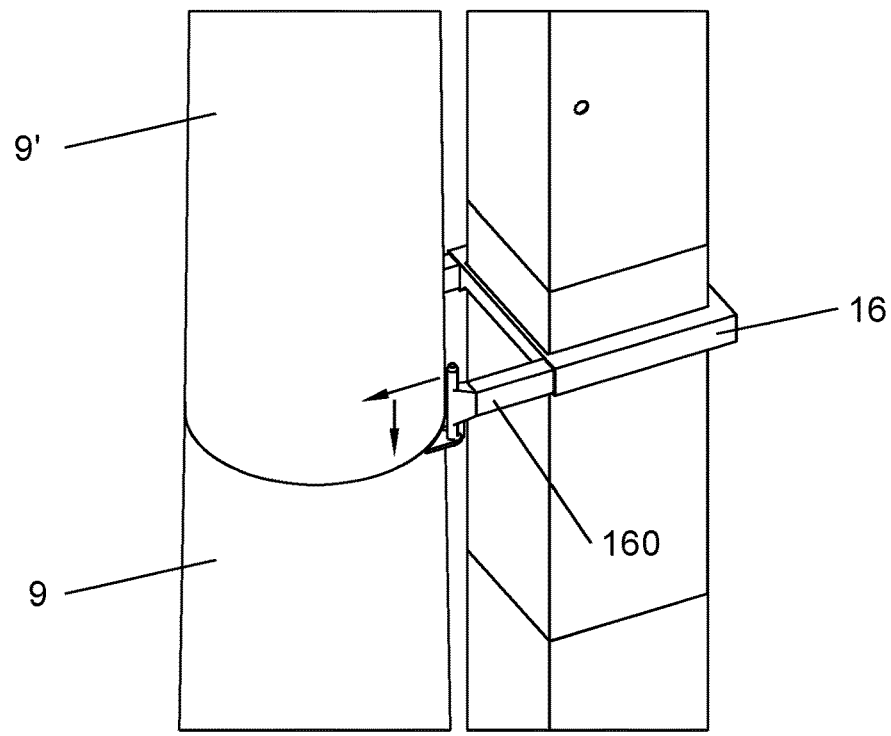

As shown in FIGS. 31 and 34, the intermediate mount 16 comprises a fixation system 160 and 161 which can engage at a top side and a bottom side of a protruding tab 90 of the upstanding construction located at a fixation point thereof. In this example, the fixation system comprises an arm 160 which extends from the mast 8 towards the construction part 9 and which at a free end is provided with a coupling element 161 formed by an upwards pointing pin and a downwards pointing pin. When engaging at the bottom side, as in FIG. 31, the upwards pointing pin extends through an eye of the protruding tab whereas in the opposite case, shown in FIG. 34, the downwards pointing pin extends from the top side into the eye.

FIG. 31 shows the upper mount 14' and intermediate mount in the initial position of the crane shown in FIG. 26. As shown, upwards pointing pin 161 projects from underneath into the eye of the protruding tab 90 and the fixation system of the upper mount 14' interlocks with a short beam 91 projecting from the part 9, by means of an upstanding, vertical lip of the beam 91 at the free end thereof at, which is admitted in a recess of the fixation system and interlocked therewith.

Figure 32:
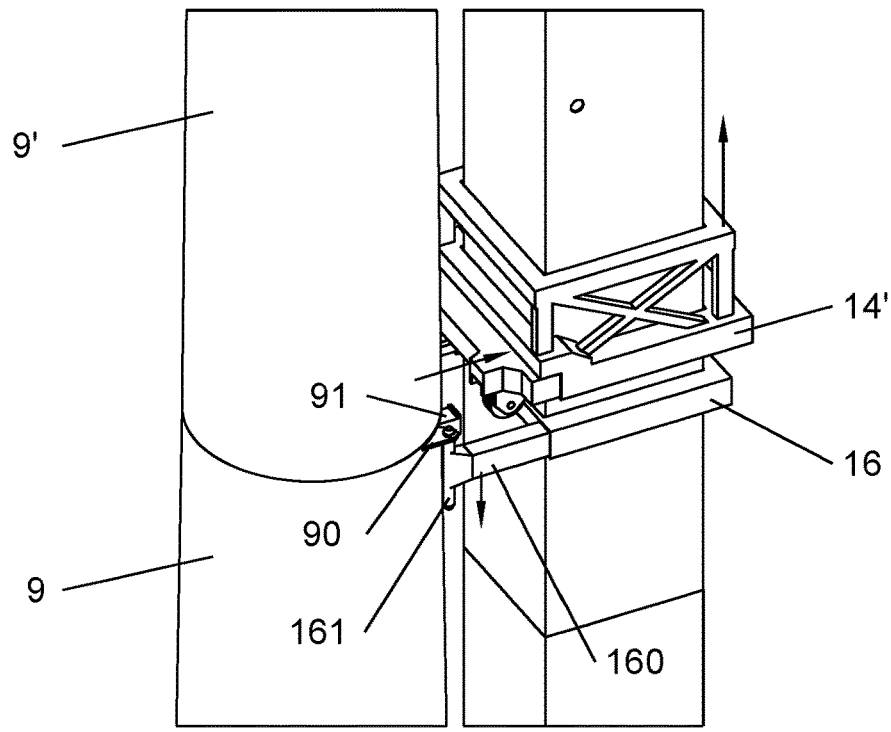
Figure 33:
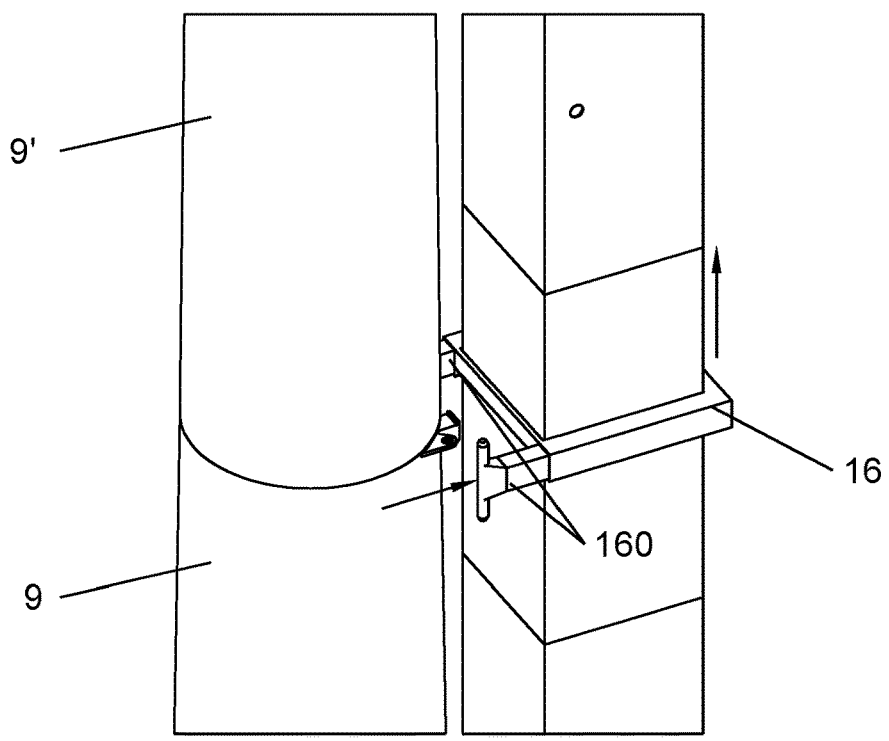

FIG. 32 shows that upper mount 14' is raised and this the interlocking attachment released. The fixation system thereof is retracted towards the mast 8, to allow, as FIG. 33 shows displacing the upper mount 14' to the position shown in FIG. 27. The intermediate mount 16 is slightly lowered to remove the pin 161 out of the eye and arms 160 are retracted. As indicated with the arrow in FIG. 33 the intermediate mount 16 is raised, arms 160 are extended such that the downward pointing pin is positioned above the eye and subsequently the mount lowered to place the pin in the eye and hence attach the mount 16 to the construction part. FIG. 34 shows the intermediate mount 16 thus re-attached to the construction part 9.

Figure 35:
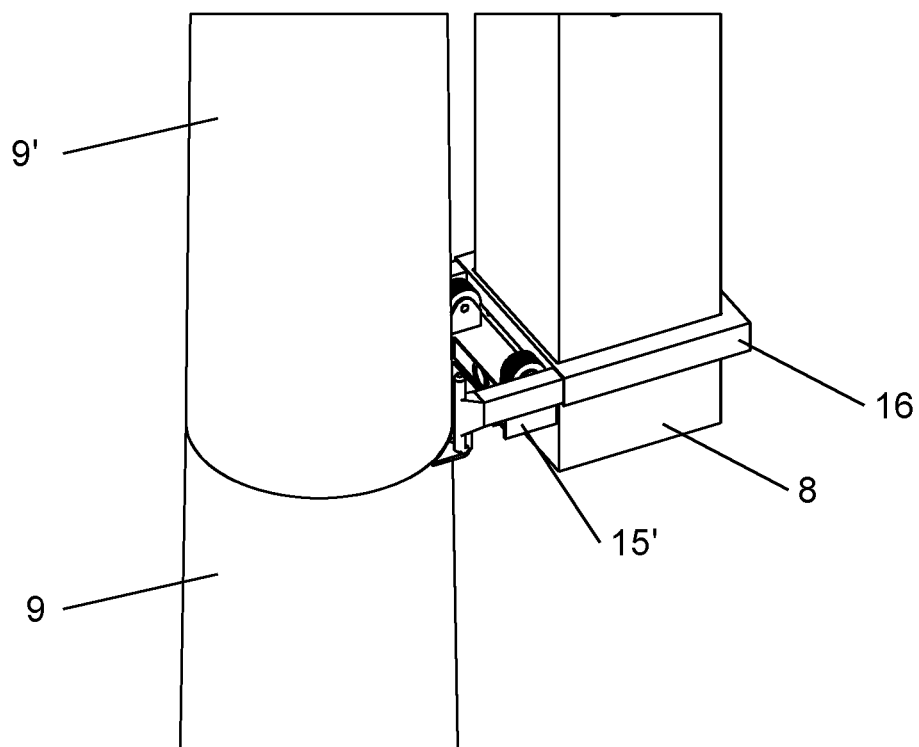
Figure 36:
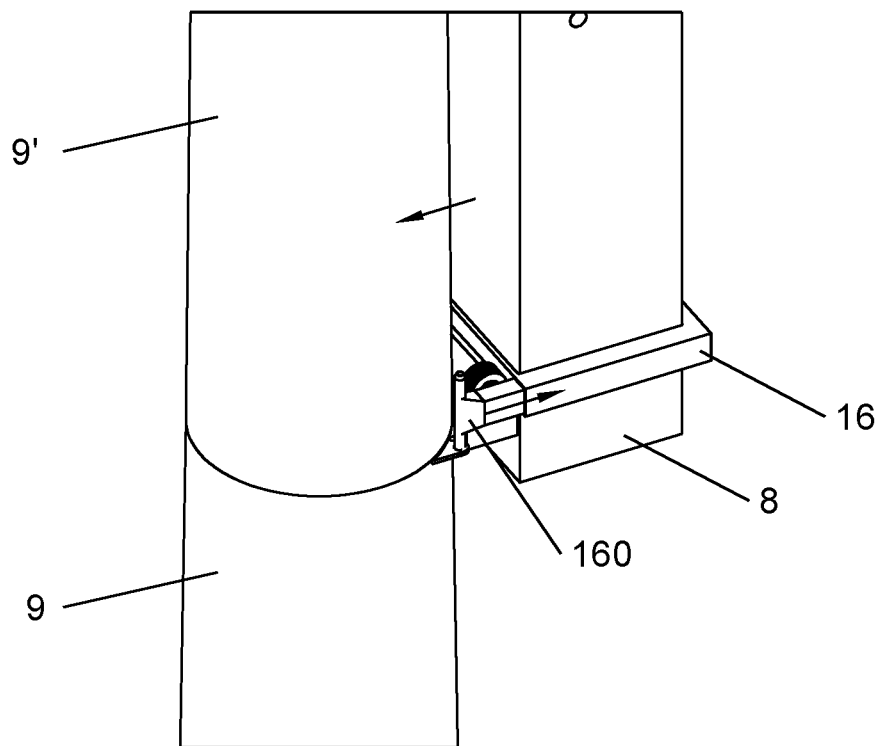

With upper mount 14' and intermediate mount 16 displaced and re-attached to the construction part 9, lower mount 15' can be released. FIG. 35 shows that after lower mount 15' is released, the mast 8 is raised and hence lower mount 15' moved into position in front of the fixation points previously used by the upper mount 14'. The fixation system 151 of the lower mount 15' is placed above the beam and lip, such that the lip can be admitted into a corresponding opening of the fixation system. FIG. 36 shows that arms 160 of the intermediate mount are retracted to pull the mast towards the construction part and thereby place the lip in front of the opening, and that the mast is slightly lowered to create the locking attachment.

FIGS. 37-50 show the use of a platform 17 for up-ending a crane 1 according to the third embodiment. The shown platform 17 comprises a support for transporting, in a non-upright position (e.g. horizontally), a bottom segment 80 of the mast 8 of the crane 1. The bottom segment 80 is provided with at least two of the mounts 14', 15' and 16, in this example with all of them to allow a secure, releasable attachment to the base of the upright construction. The platform is further provided with a powered tilting system 18, such as a hydraulic or pneumatic cylinder and associated power supply, for tilting the bottom segment 80 relative to the support 17, and in this example also vice versa. It will be apparent that in FIGS. 37-50 the platform is shown only schematically and that e.g. the platform may be provided on a (semi)trailer or other transport means not shown in the figures and be held in position relative to the ground by e.g. not shown support legs.

Figure 37:
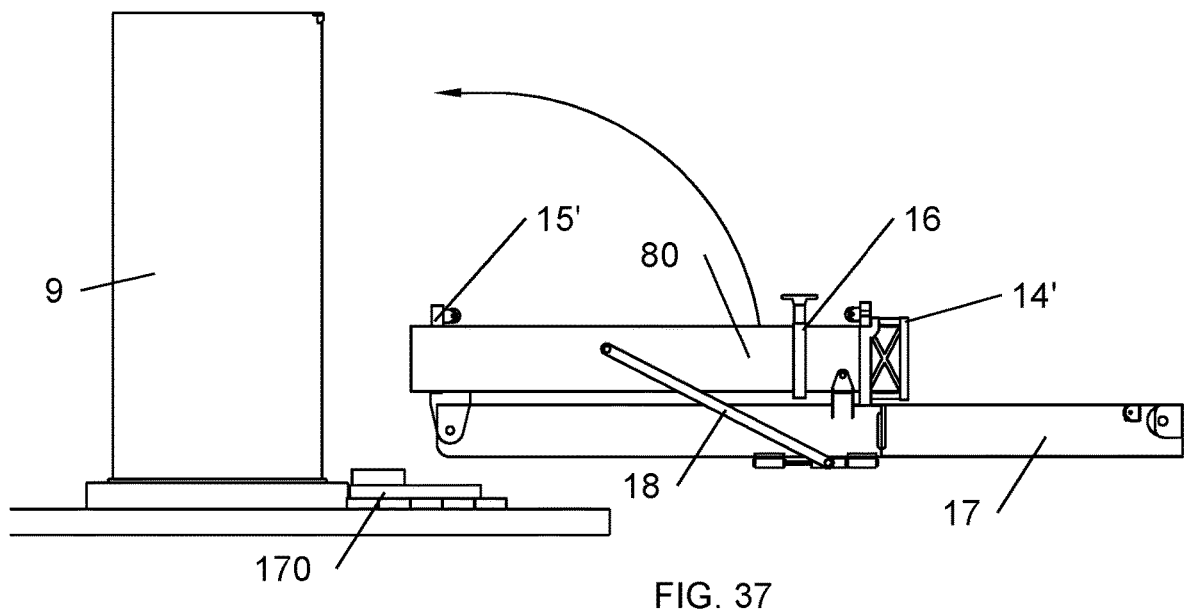
FIGS. 37-50 illustrate a method of up-ending a crane according to an embodiment of the present invention.

FIGS. 37-50 illustrate a method of up-ending the crane using the platform. In such a method, the powered tilting system puts the bottom segment (provided in a non-upright position on the support) in an upright position. This is shown in FIG. 37, where the bottom segment 80 is tilted, as indicated with the arrow, to come to stand upright on a base 170.

Figure 38:
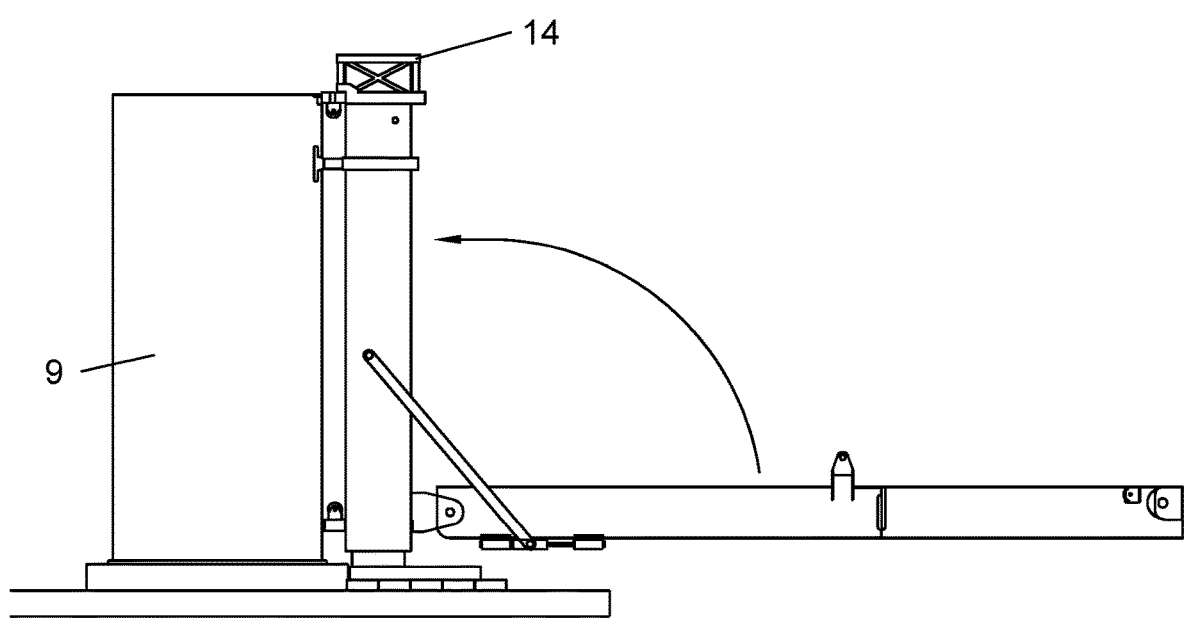

The bottom segment 80 may then be fixated relative to the upstanding construction by attaching the at least two mounts to the upstanding construction, as FIG. 38 shows. The powered tilting system can then tilt the support relative to the bottom segment 80 to put the support in an upright position. For example, the hydraulic or pneumatic cylinder that expanded to push the bottom segment 80 upright may be retracted to pull the support towards the upright bottom segment.

Figure 39:
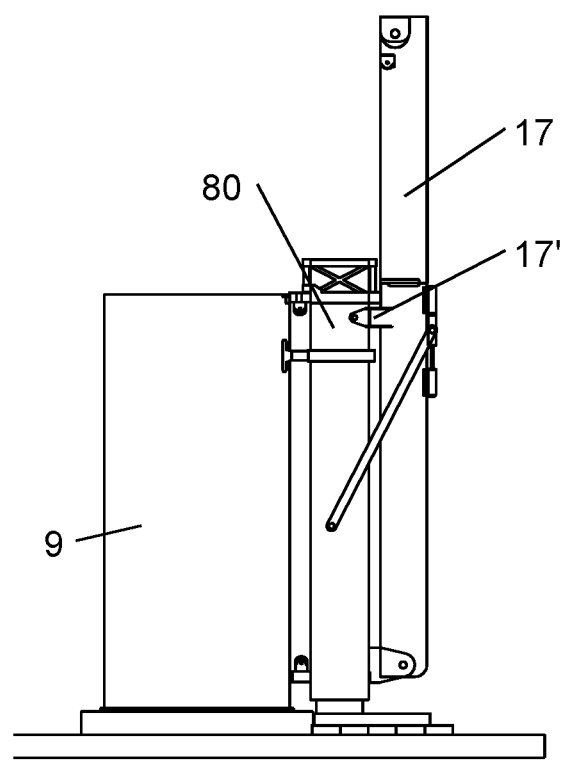

FIG. 39 shows the support 17 up-ended. As shown, the support is fixated relative to the bottom segment 80 by a releasable fixation 171. In this example the attachment of the cylinder is displaced as well to be further away from the pivot axis between support 17 and bottom segment 80 and hence keep the support 17 fixated. A support base 170' is provided on which bottom end of the support 17 rests.

Figure 40:
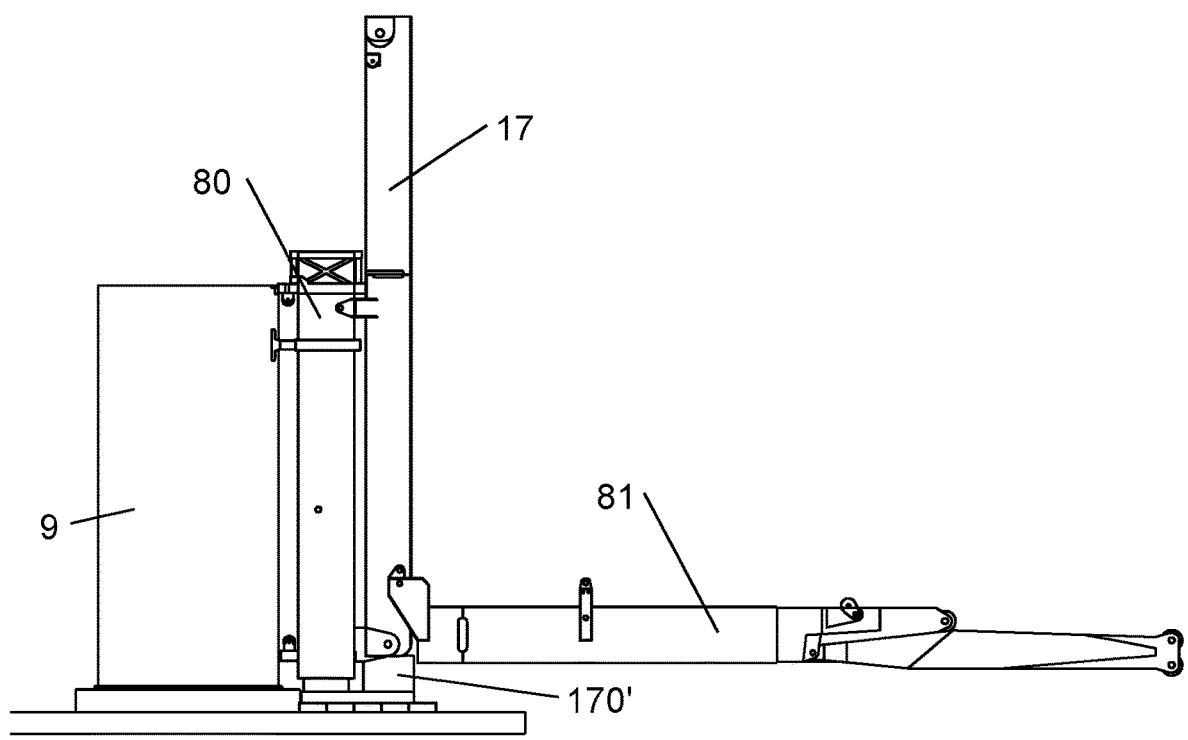
Figure 41:
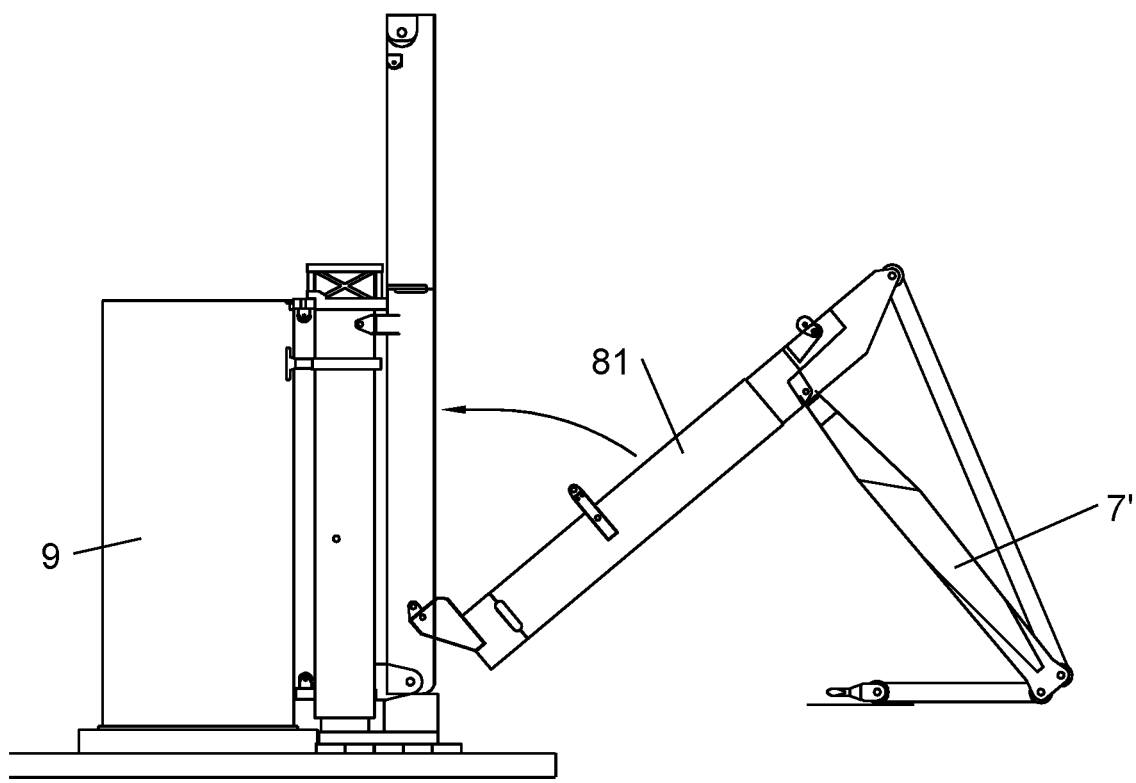
Figure 42:
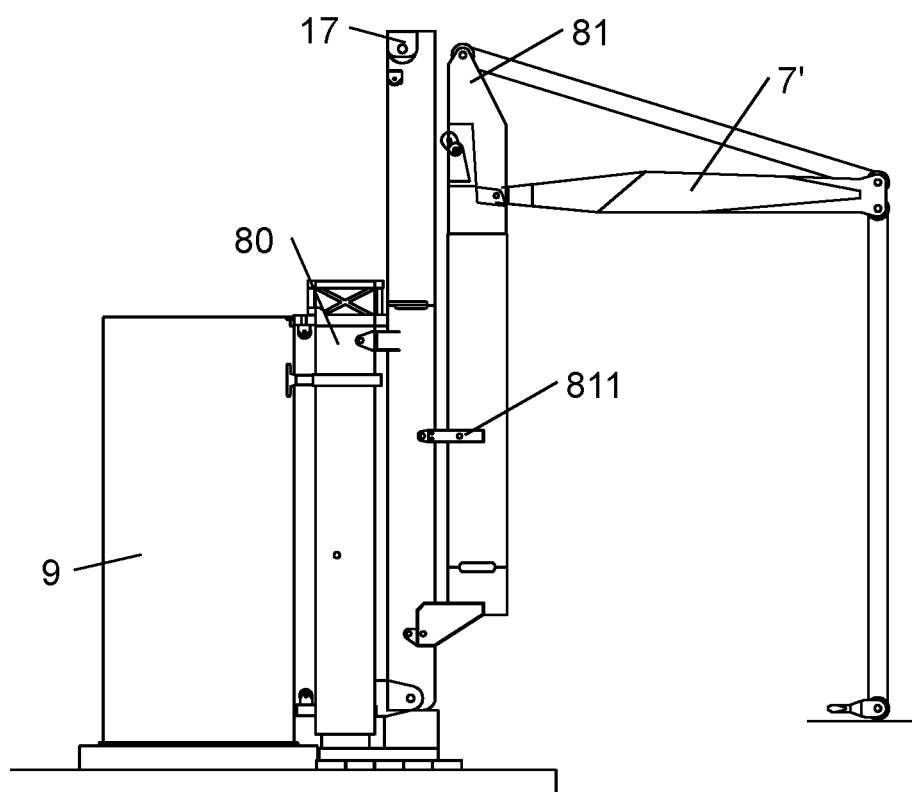

FIGS. 40-42 shows putting one or more further segments 81 and 82, including a top segment 81, from a non-upright position in an upright position. As shown, the top segment 81 is pivotably attached to the support and pivoted to an upright position. In this example, the jib 7' of the crane on the top segment 81 is used to push the top segment upright, as shown in FIG. 41. Once in an upright position, the top segment is fixated to the support 17. FIG. 42 shows the crane and support after releasably fixating the top segment at a position 811 remote from the pivot point.

FIGS. 43-48 show guiding the further segment 81 and 82 along the upright support 17 to move them upwards. A lower extremity of the further segments 81 and 82 is moved beyond the top of the bottom segment 80, and the further segment 81 and 82 is placed on top of the bottom segment 80.

In these examples, this comprises, in addition to putting the top segment 81 from a non-upright position in an upright position, stacking the top segment 81 and one or more intermediate segments 82 of the crane.

Figure 43:
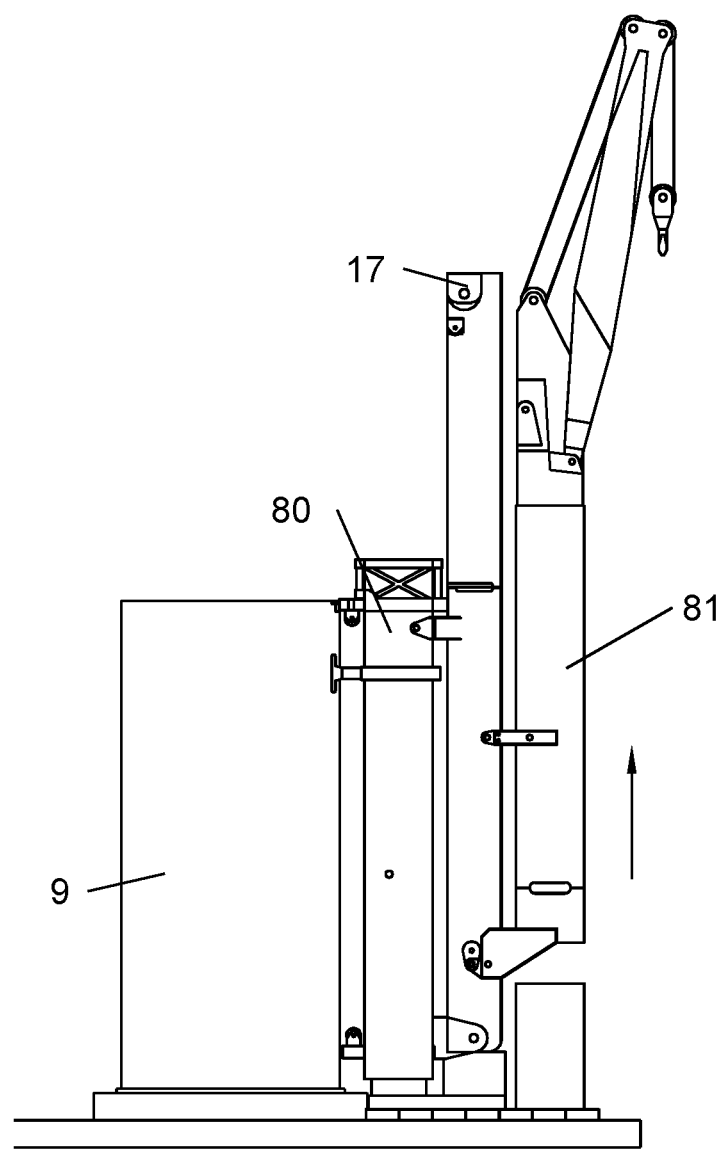

FIG. 43 shows that the top segment 81 is guided along the upright support to move upwards to a distance sufficient to place one or more intermediate segment in an upright position thereunder. It will be apparent that if there are intermediate segments already stacked thereunder, the entire stack is moved upwards to create sufficient space underneath the stack.

Figure 44:
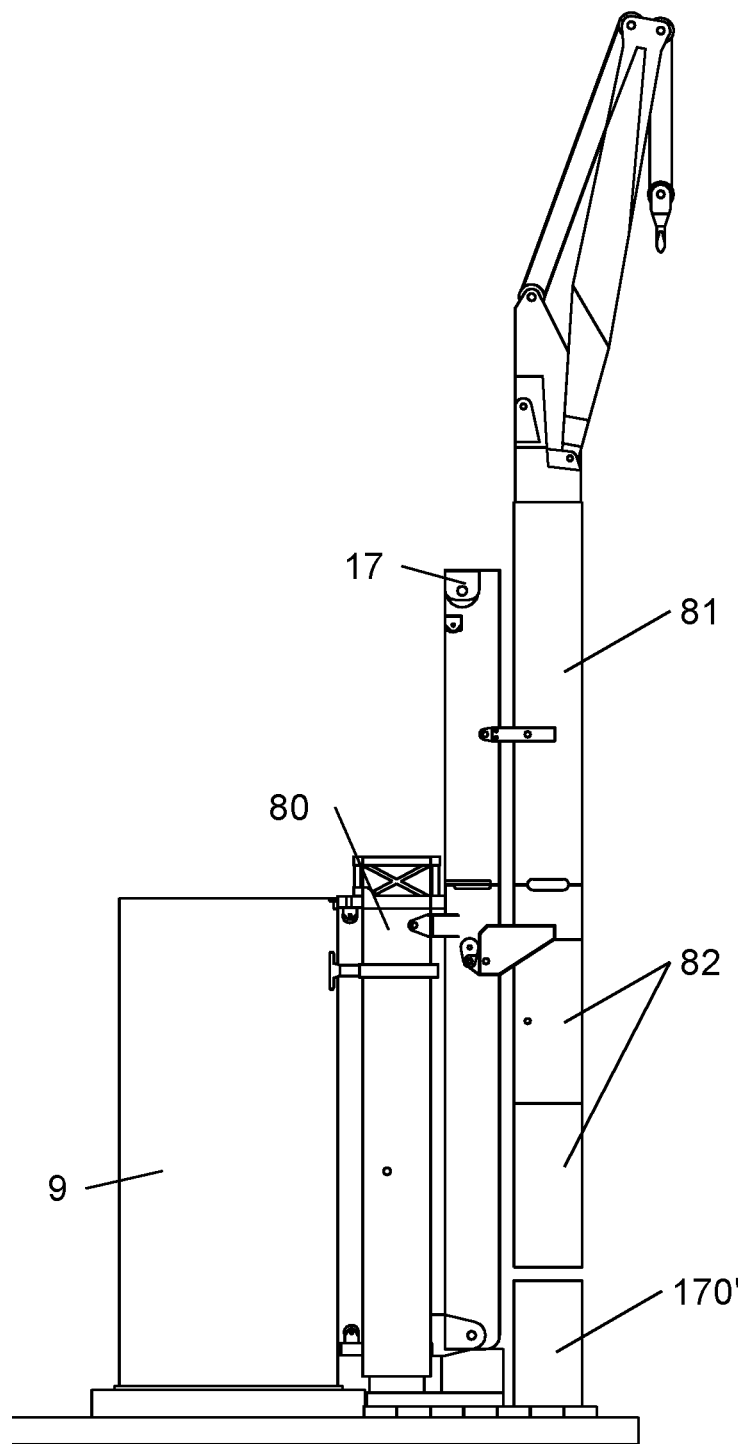

FIG. 44 shows that one or more intermediate segments 82 are provided in the space created by moving the stack upwards. The intermediate segment(s) may be up-ended in a manner similar as the top segment 81. The process of moving the stack upwards and placing an intermediate segment can be repeated until all intermediate segments of the mast 8 are stacked.

Figure 45:
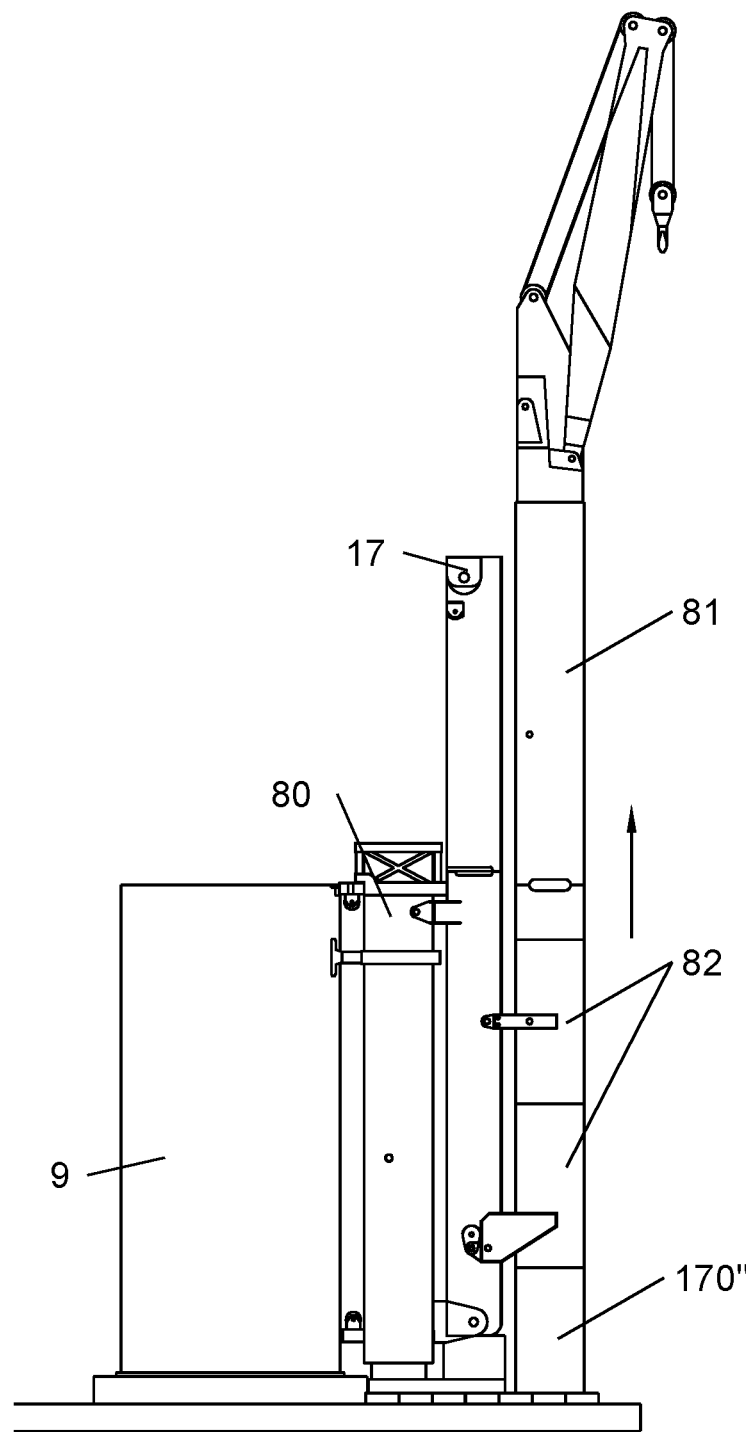
Figure 46:
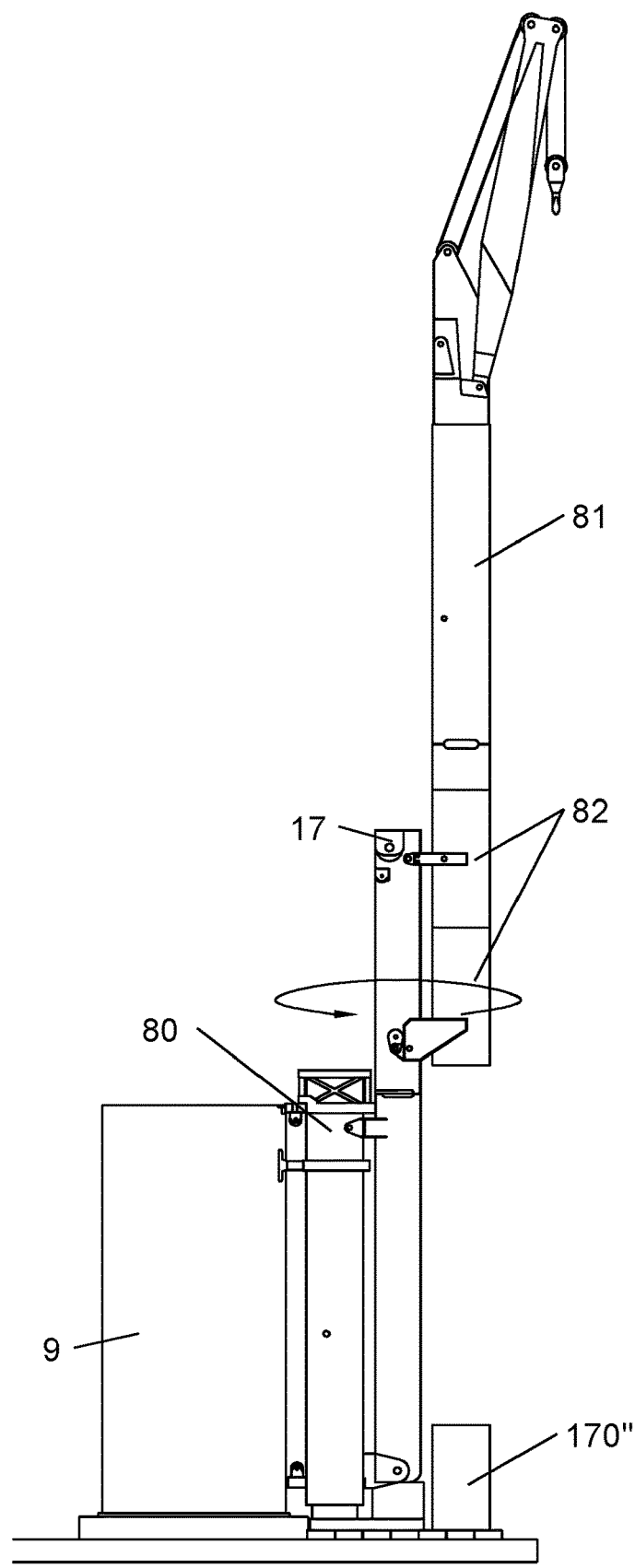

FIG. 45 shows the stack resting on a support base 170". As indicated with the arrow the entire stack can be moved upwards until the bottom end thereof is above the top end of the bottom segment 80. This is shown in FIG. 46.

Figure 47:
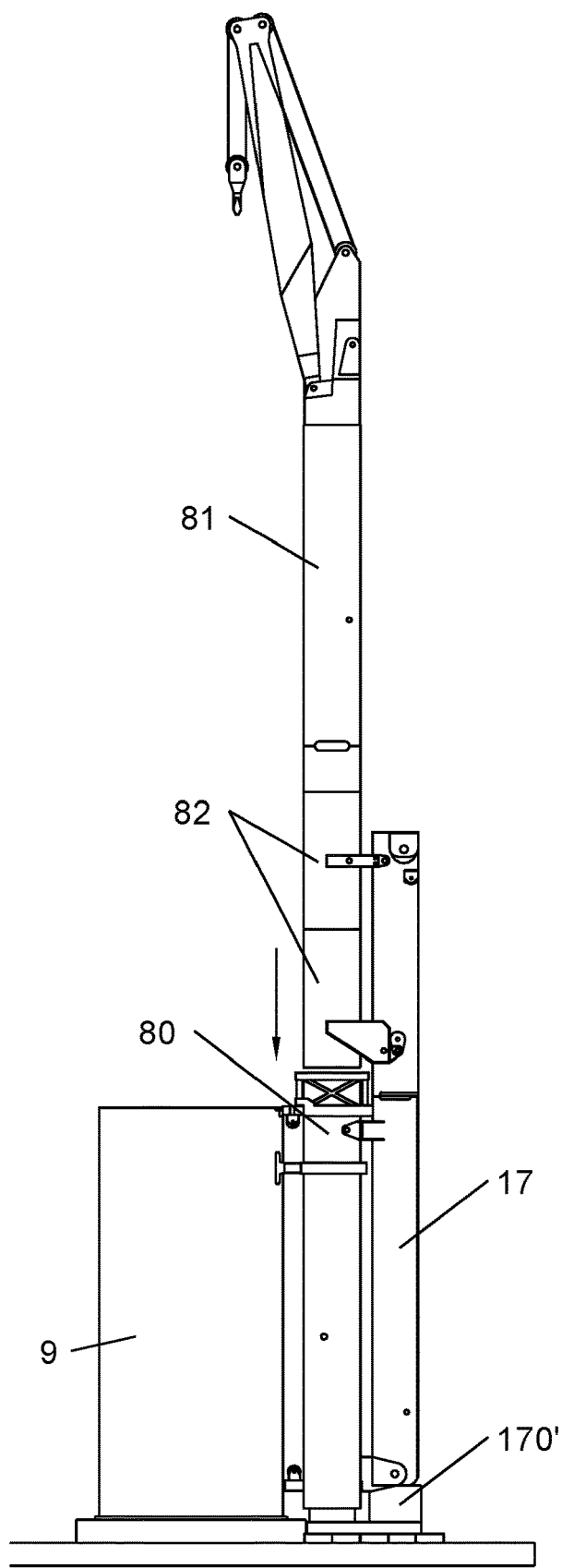

FIG. 47 shows that the stack is placed on top of the bottom segment 80. In this example, the stack is attached to the support which is rotated 180 degrees around its longitudinal axis, thus placing the stack at the other side of the support 17, which is the same side as the bottom segment 80.

Figure 48:
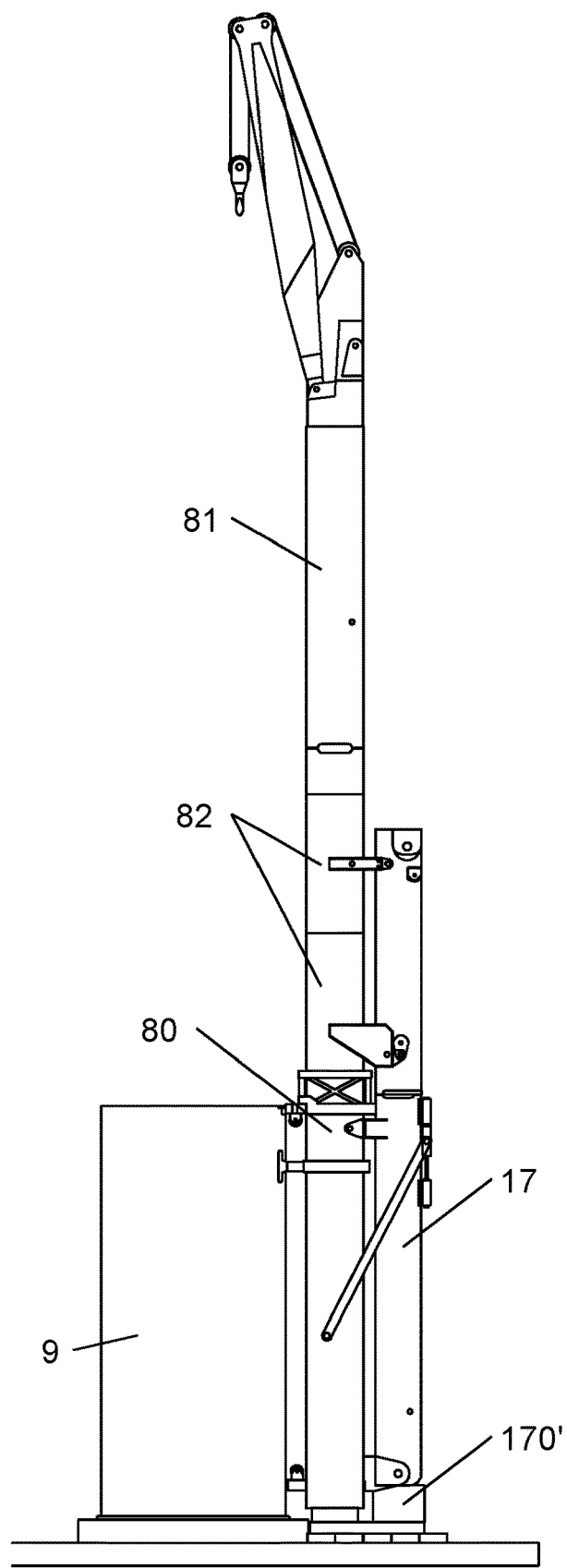

FIG. 48 shows that the stack is lowered and thereby placed on the bottom segment 80 and hence the crane 1 is completed.

Figure 49:
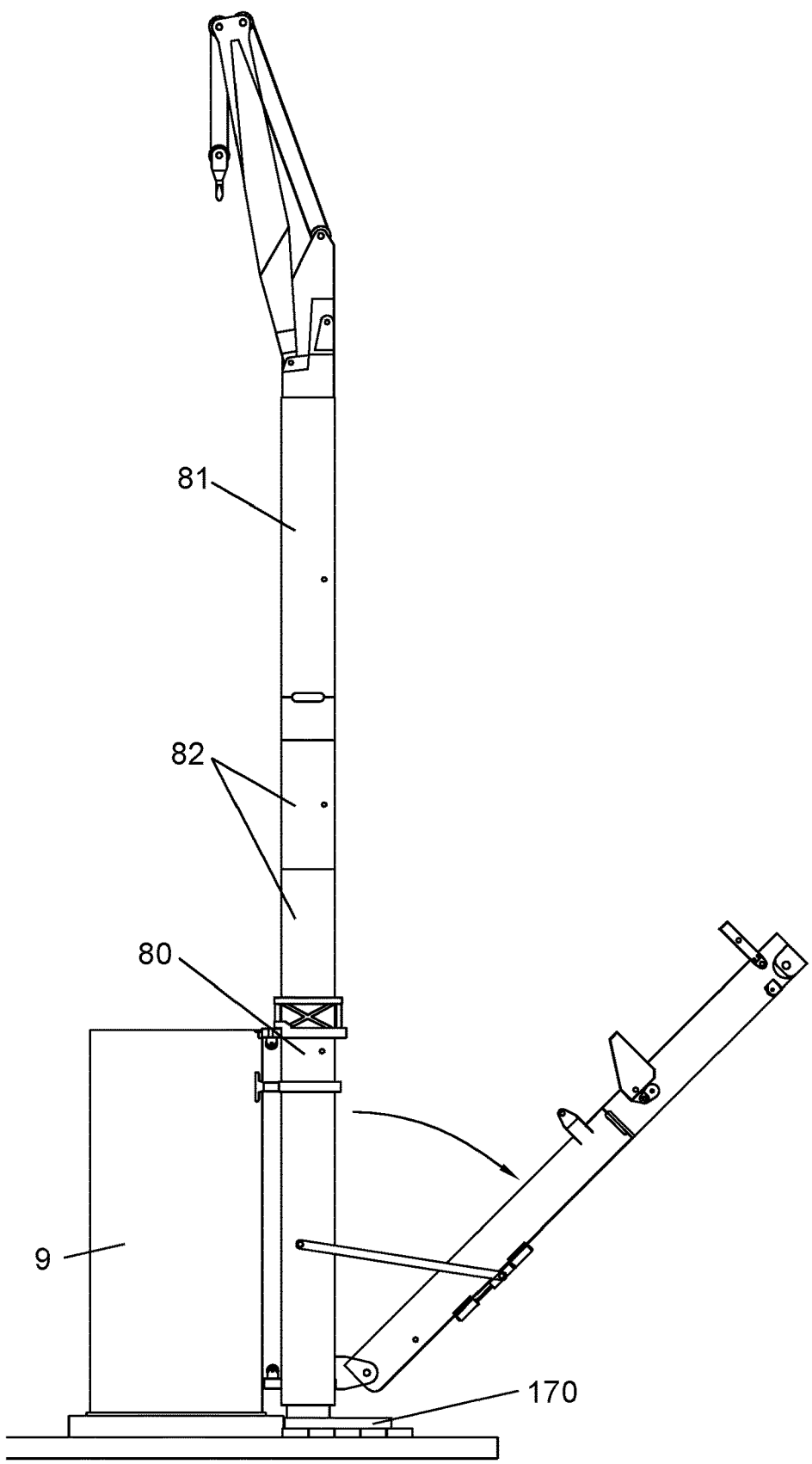
Figure 50:
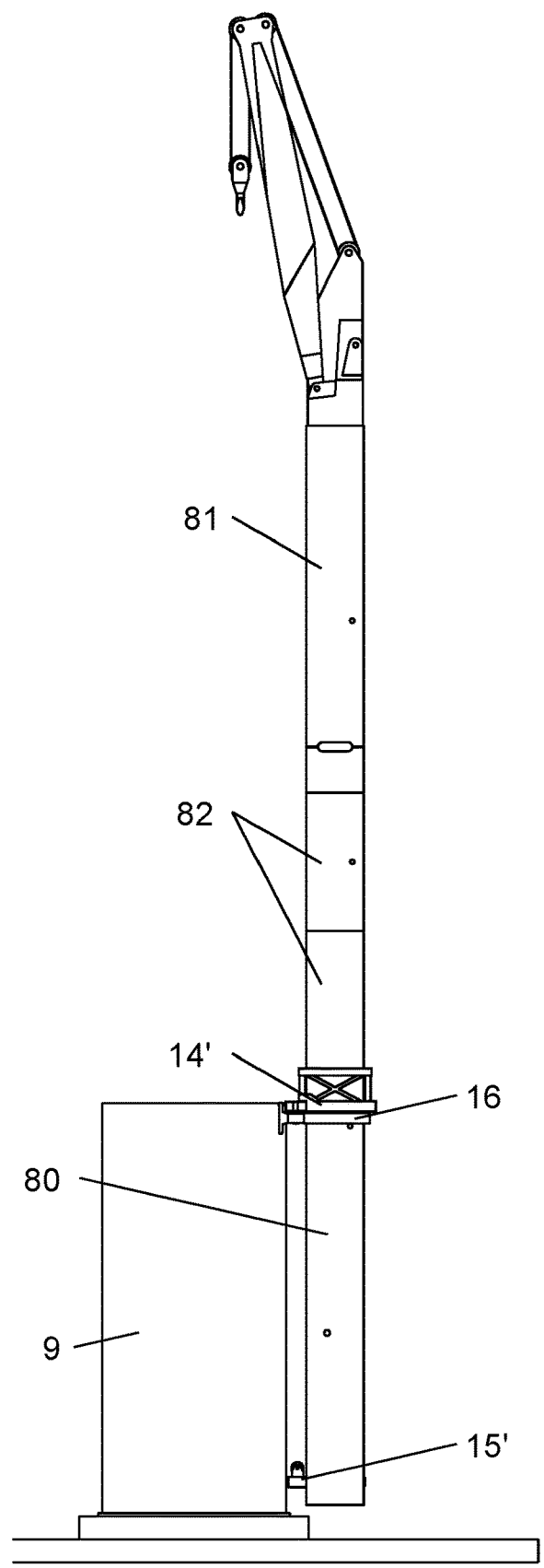

FIGS. 49-50 show removing the support 17 from the crane 1. As shown in FIG. 49, the powered tilting system can tilt the support relative to the bottom segment to put the support in an non-upright position. FIG. 50 shows that the support is detached and moved away from the crane. It will be apparent that the platform with the support 17 may then be used to install another crane. It will be apparent that, for example thereafter, the crane 1 may be unfolded, e.g. in the manner described with reference to FIGS. 3-7 above.

Finally it is remarked that the upper part 1' of the crane 1 comprising the crane's hoisting means is at all times freely rotatable with reference to the mast 8, which is particularly beneficial for the crane's ability to handle all loads that are required for building and erecting the construction.

Although the invention has been discussed in the foregoing with reference to exemplary embodiments of applying the method of the invention, the invention is not restricted to these particular embodiments which can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these embodiments. The scope of protection of the invention shall therefore be construed in accordance with the appended claims only, wherein a possible ambiguity in the wording of the claims shall be resolved using these exemplary embodiments. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Note that in the specification and claims, "about" or "approximately" means within twenty percent (20%) of the numerical amount cited unless otherwise specified.

The invention claimed is:

1. A crane comprising:
   a mast;
   hoisting means rotatably mounted on the mast; and
   a vertical support and guide facility comprising mounts releasably attachable to an upstanding construction comprising longitudinal construction parts, wherein the mounts are attached to the mast such that the mast is movable up and down along the upstanding construction when at least some of the mounts are attached to the upstanding construction, wherein the mounts comprise a lower mount, an upper mount and an intermediate mount between the lower mount and the upper mount, the intermediate mount being displaceable between the lower mount and the upper mount in opposite directions along the longitudinal direction of the mast, and wherein at least one of the upper mount and/or the lower mount is displaceable, relative to the mast, between the intermediate mount and an extremity of the mast, in opposite directions parallel to the longitudinal direction towards and away from the extremity.

2. The crane according to claim 1, wherein the intermediate mount comprises a fixation system which can engage at a top side and a bottom side of a protruding tab of the upstanding construction at a fixation point thereof.

3. The crane according to claim 1, wherein the lower mount is fixated relative to the mast.

4. The crane according to claim 1, wherein each of the mounts comprises a fixation system for releasably attaching to the upstanding construction at different fixation points which in circumferential direction of the upstanding construction are spaced apart.

5. The crane according to claim 4, wherein each of the fixation systems releasably attach to the upstanding construction simultaneously.

6. The crane according to claim 4, wherein the intermediate mount comprises a fixation system for engaging at fixation points different from the fixation points engaged by the upper mount and the lower mount.

* * * * *